United States Patent
Popp

(10) Patent No.: US 8,498,729 B2
(45) Date of Patent: Jul. 30, 2013

(54) MANUFACTURING EXECUTION SYSTEM FOR USE IN MANUFACTURING BABY FORMULA

(75) Inventor: Shane M. Popp, Santa Monica, CA (US)

(73) Assignee: SMP Logic Systems LLC, Los Angeles (*) Notice: Subject to any disclaimer, the term of this patent is extended or adjusted under 35 U.S.C. 154(b) by 792 days.

(21) Appl. No.: 12/583,708

(22) Filed: Aug. 25, 2009

(65) Prior Publication Data
US 2010/0063613 A1    Mar. 11, 2010

Related U.S. Application Data

(60) Provisional application No. 61/190,553, filed on Aug. 29, 2008.

(51) Int. Cl.
| | |
|---|---|
| *G06F 19/00* | (2011.01) |
| *G05B 13/02* | (2006.01) |
| *A23J 1/00* | (2006.01) |
| *A23L 3/16* | (2006.01) |
| *A23L 3/10* | (2006.01) |
| *B65B 55/00* | (2006.01) |
| *G06Q 10/06* | (2012.01) |
| *G05B 13/04* | (2006.01) |
| *A23J 3/16* | (2006.01) |
| *A23L 3/22* | (2006.01) |

(52) U.S. Cl.
CPC .............. *G06Q 10/06* (2013.01); *G05B 13/042* (2013.01); *A23J 3/16* (2013.01); *A23L 3/22* (2013.01); *A23L 3/10* (2013.01)

USPC ............ 700/110; 700/117; 700/109; 700/28; 700/95; 426/656; 426/521; 426/407

(58) Field of Classification Search
USPC ......................................................... 700/110
See application file for complete search history.

(56) References Cited

U.S. PATENT DOCUMENTS

| | | | |
|---|---|---|---|
| 2,998,315 A | | 8/1961 | Peebles et al. |
| 3,201,245 A | | 8/1965 | Clark et al. |
| 3,841,756 A | | 10/1974 | Grochowicz |
| 3,901,979 A | | 8/1975 | Nagasawa et al. |
| 3,995,071 A | * | 11/1976 | Goodnight et al. ........... 426/598 |
| 4,149,411 A | | 4/1979 | Fisher et al. |

(Continued)

FOREIGN PATENT DOCUMENTS

| | | | |
|---|---|---|---|
| EP | 2036447 A1 | * | 3/2009 |
| WO | WO 03/055322 A1 | | 7/2003 |

(Continued)

OTHER PUBLICATIONS

Cook, D., "Nutrient Levels in Infant Formulas: Technical Considerations", Nov. 1988, Committee on Nutritional Sciences, Infant Formula Council, Atlanta, GA, Symposium: Upper Limits of Nutrients in Infant Formulas.*

(Continued)

*Primary Examiner* — Mohammad Ali
*Assistant Examiner* — Kelvin Booker

(57) ABSTRACT

Manufacturing execution systems and methods thereof used to monitor and execute a baby formula manufacturing process are disclosed herein. Consequently, the methods and systems provide a means to perform validation and quality manufacturing on an integrated level whereby baby formula manufacturers can achieve data and product integrity and ultimately minimize cost.

14 Claims, 7 Drawing Sheets

U.S. PATENT DOCUMENTS

| | | | |
|---|---|---|---|
| 4,216,236 A | 8/1980 | Mueller et al. | |
| 4,303,692 A * | 12/1981 | Gaull | 426/580 |
| 4,419,369 A | 12/1983 | Nichols, Jr. et al. | |
| 4,544,559 A | 10/1985 | Gil et al. | |
| 4,642,238 A | 2/1987 | Lin et al. | |
| 4,661,126 A * | 4/1987 | Inagami et al. | 95/283 |
| 4,663,172 A | 5/1987 | Wenner | |
| 4,692,340 A * | 9/1987 | Grutte et al. | 426/72 |
| 4,710,387 A | 12/1987 | Uiterwaal et al. | |
| 4,753,926 A * | 6/1988 | Lucas et al. | 514/5.5 |
| 4,830,205 A * | 5/1989 | Hammond et al. | 215/11.3 |
| 4,840,814 A | 6/1989 | Harada et al. | |
| 4,923,709 A * | 5/1990 | Slimak | 426/640 |
| 4,925,696 A * | 5/1990 | Slimak | 426/637 |
| 4,925,697 A * | 5/1990 | Slimak | 426/637 |
| 4,929,467 A * | 5/1990 | Slimak | 426/637 |
| 4,946,703 A * | 8/1990 | Slimak | 426/637 |
| 5,007,232 A | 4/1991 | Caudill | |
| 5,013,569 A | 5/1991 | Rubin | |
| 5,039,532 A | 8/1991 | Jost et al. | |
| 5,186,963 A | 2/1993 | Howman | |
| 5,374,657 A | 12/1994 | Kyle | |
| 5,378,488 A * | 1/1995 | Dimler et al. | 426/580 |
| 5,443,857 A | 8/1995 | Arph et al. | |
| 5,447,642 A | 9/1995 | Schenach | |
| 5,449,523 A | 9/1995 | Hansen et al. | |
| 5,488,039 A * | 1/1996 | Masor et al. | 514/43 |
| 5,492,899 A * | 2/1996 | Masor et al. | 514/47 |
| 5,565,425 A | 10/1996 | Yamamoto et al. | |
| 5,570,816 A | 11/1996 | LaBarbera, Jr. | |
| 5,602,109 A * | 2/1997 | Masor et al. | 514/45 |
| 5,700,590 A * | 12/1997 | Masor et al. | 426/656 |
| 5,773,061 A * | 6/1998 | Getler et al. | 426/285 |
| 5,783,245 A | 7/1998 | Simpson, II | |
| 5,795,611 A * | 8/1998 | Slattery | 426/580 |
| 5,814,363 A | 9/1998 | Kuehner | |
| 5,837,309 A * | 11/1998 | Theuer | 426/615 |
| 5,846,583 A | 12/1998 | Gentner | |
| 5,858,449 A * | 1/1999 | Crank et al. | 426/656 |
| 5,902,617 A | 5/1999 | Pabst | |
| 5,942,274 A * | 8/1999 | Slattery | 426/580 |
| 6,039,985 A | 3/2000 | Kamarei | |
| 6,063,433 A | 5/2000 | Benward et al. | |
| 6,149,964 A * | 11/2000 | Theuer et al. | 426/614 |
| 6,165,532 A | 12/2000 | Mutti et al. | |
| 6,186,681 B1 | 2/2001 | Szembrot et al. | |
| 6,264,889 B1 | 7/2001 | Tottenham et al. | |
| 6,270,827 B1 | 8/2001 | Gaull et al. | |
| 6,365,177 B1 | 4/2002 | Shahadeh | |
| 6,399,090 B1 | 6/2002 | Shehadeh | |
| 6,428,832 B2 | 8/2002 | Van Den Burg et al. | |
| 6,579,551 B1 * | 6/2003 | Theuer et al. | 426/321 |
| 6,596,767 B2 | 7/2003 | Masor et al. | |
| 6,656,903 B1 | 12/2003 | Sawatzki et al. | |
| 6,759,071 B2 * | 7/2004 | Nye et al. | 426/394 |
| 6,814,988 B2 | 11/2004 | Knight et al. | |
| 6,849,268 B2 | 2/2005 | Lasekan et al. | |
| 6,866,003 B2 | 3/2005 | Schulze-Wartenhorst | |
| 6,866,861 B1 | 3/2005 | Luhman | |
| 6,874,000 B2 * | 3/2005 | Sholl et al. | 706/924 |
| 6,875,459 B2 | 4/2005 | Kopf et al. | |
| 6,881,428 B2 | 4/2005 | Lange | |
| 6,887,505 B2 | 5/2005 | Reaves et al. | |
| 6,893,675 B1 | 5/2005 | Jacobson et al. | |
| 6,901,848 B2 | 6/2005 | Beretta | |
| 6,905,721 B2 | 6/2005 | Jacobson et al. | |
| 7,032,816 B2 * | 4/2006 | Markham et al. | 235/376 |
| 7,037,518 B2 | 5/2006 | Luhman | |
| 7,043,327 B2 | 5/2006 | Tsai et al. | |
| 7,070,825 B2 | 7/2006 | Ndife et al. | |
| 7,090,862 B2 * | 8/2006 | Barrett-Reis et al. | 424/439 |
| 7,131,393 B2 | 11/2006 | Woolford et al. | |
| 7,141,266 B2 * | 11/2006 | Theuer et al. | 426/614 |
| 7,150,370 B2 | 12/2006 | Pyun | |
| 7,155,345 B1 | 12/2006 | Arnvidarson | |
| 7,273,632 B2 * | 9/2007 | Gazzolo et al. | 426/580 |
| 7,322,491 B2 | 1/2008 | Py et al. | |
| 7,323,200 B2 * | 1/2008 | Chmura et al. | 426/46 |
| 7,378,123 B2 * | 5/2008 | Etzel et al. | 426/656 |
| 7,412,461 B2 * | 8/2008 | Sholl et al. | 706/924 |
| 7,413,759 B2 * | 8/2008 | Birch et al. | 426/614 |
| 7,441,030 B1 | 10/2008 | Smith et al. | |
| 7,607,913 B2 | 10/2009 | Wells | |
| 7,618,669 B2 * | 11/2009 | Rangavajla et al. | 426/583 |
| 7,648,721 B2 * | 1/2010 | Edens et al. | 426/34 |
| 7,776,332 B1 * | 8/2010 | Kuslys et al. | 424/157.1 |
| 7,954,521 B2 * | 6/2011 | Py et al. | 141/329 |
| 8,007,847 B2 * | 8/2011 | Biderman et al. | 426/231 |
| 8,026,211 B2 * | 9/2011 | Sukhotnik et al. | 514/5.9 |
| 8,071,152 B2 * | 12/2011 | Etzel et al. | 426/656 |
| 8,137,718 B2 * | 3/2012 | Russell et al. | 426/61 |
| 8,153,973 B2 * | 4/2012 | Williams | 250/336.1 |
| 8,213,007 B2 * | 7/2012 | Wang et al. | 356/326 |
| 2002/0002907 A1 * | 1/2002 | Brockbank | 99/277.2 |
| 2002/0044989 A1 | 4/2002 | Gaull | |
| 2002/0086039 A1 * | 7/2002 | Lee et al. | 424/401 |
| 2003/0072865 A1 | 4/2003 | Bindels et al. | |
| 2003/0124232 A1 * | 7/2003 | Nye et al. | 426/399 |
| 2003/0157238 A1 * | 8/2003 | Cary et al. | 426/601 |
| 2003/0207004 A1 | 11/2003 | Theuer et al. | |
| 2004/0086617 A1 * | 5/2004 | Gazzolo et al. | 426/580 |
| 2004/0132989 A1 | 7/2004 | Lifran et al. | |
| 2004/0203134 A1 * | 10/2004 | Pyntikov et al. | 435/252.1 |
| 2005/0180963 A1 * | 8/2005 | Adams et al. | 424/93.45 |
| 2005/0238341 A1 | 10/2005 | Thaler et al. | |
| 2005/0251278 A1 | 11/2005 | Popp | |
| 2005/0287247 A1 * | 12/2005 | Sorensen et al. | 426/72 |
| 2006/0003073 A1 * | 1/2006 | Etzel et al. | 426/583 |
| 2006/0007781 A1 | 1/2006 | Martin et al. | |
| 2006/0013927 A1 | 1/2006 | Geveke et al. | |
| 2006/0035922 A1 * | 2/2006 | Mathias et al. | 514/303 |
| 2006/0078649 A1 * | 4/2006 | Petermann et al. | 426/72 |
| 2006/0209630 A1 | 9/2006 | Brown et al. | |
| 2006/0210697 A1 * | 9/2006 | Mower | 426/658 |
| 2006/0233762 A1 | 10/2006 | McMahon et al. | |
| 2006/0246244 A1 * | 11/2006 | Jenkins et al. | 428/35.2 |
| 2006/0271227 A1 | 11/2006 | Popp | |
| 2006/0276923 A1 | 12/2006 | Popp | |
| 2006/0278093 A1 * | 12/2006 | Biderman et al. | 99/282 |
| 2006/0286252 A1 * | 12/2006 | Rangavajla et al. | 426/580 |
| 2006/0286267 A1 * | 12/2006 | Theuer et al. | 426/614 |
| 2007/0014892 A1 | 1/2007 | Mitchell et al. | |
| 2007/0021856 A1 | 1/2007 | Popp | |
| 2007/0032897 A1 | 2/2007 | Popp | |
| 2007/0067125 A1 * | 3/2007 | Guivarch et al. | 700/109 |
| 2007/0104700 A1 | 5/2007 | Garcia-Rodenas et al. | |
| 2007/0110849 A1 | 5/2007 | Secretin | |
| 2007/0218169 A1 * | 9/2007 | Meiri-Bendek et al. | 426/72 |
| 2007/0243290 A1 * | 10/2007 | Thompson et al. | 426/72 |
| 2007/0275021 A1 * | 11/2007 | Lee et al. | 424/401 |
| 2007/0281068 A1 * | 12/2007 | Boff et al. | 426/588 |
| 2008/0003329 A1 * | 1/2008 | Rueda et al. | 426/72 |
| 2008/0003330 A1 * | 1/2008 | Rueda et al. | 426/72 |
| 2008/0057178 A1 * | 3/2008 | Rueda et al. | 426/656 |
| 2008/0064635 A1 * | 3/2008 | Rueda et al. | 514/12 |
| 2008/0107769 A1 | 5/2008 | Tay et al. | |
| 2008/0145475 A1 * | 6/2008 | Flatt et al. | 426/2 |
| 2008/0193624 A1 * | 8/2008 | Shulman et al. | 426/590 |
| 2008/0240978 A1 * | 10/2008 | Sorensen et al. | 422/20 |
| 2008/0260923 A1 * | 10/2008 | Kratky et al. | 426/471 |
| 2009/0094940 A1 * | 4/2009 | Py | 53/267 |
| 2009/0098250 A1 * | 4/2009 | Py | 426/62 |
| 2009/0139978 A1 * | 6/2009 | Ha | 219/441 |
| 2009/0214498 A1 * | 8/2009 | Ross et al. | 424/93.45 |
| 2009/0282004 A1 * | 11/2009 | Williams | 707/3 |
| 2009/0297672 A1 * | 12/2009 | Warne | 426/106 |
| 2009/0304655 A1 * | 12/2009 | Donnet-Hughes et al. | 424/93.44 |
| 2009/0308485 A1 * | 12/2009 | Py | 141/1 |
| 2010/0034958 A1 * | 2/2010 | Sorensen et al. | 426/657 |
| 2010/0068354 A1 * | 3/2010 | Roberson et al. | 426/118 |
| 2010/0074870 A1 * | 3/2010 | Russell et al. | 424/93.4 |
| 2010/0074871 A1 * | 3/2010 | Russell et al. | 424/93.4 |
| 2010/0086527 A1 * | 4/2010 | Huber-Haag et al. | 424/93.45 |
| 2010/0112152 A1 * | 5/2010 | Sinnema et al. | 426/248 |
| 2010/0119617 A1 * | 5/2010 | O'Connor | 424/602 |
| 2010/0304357 A1 * | 12/2010 | Meyers et al. | 435/4 |

| | | | | |
|---|---|---|---|---|
| 2011/0020304 | A1* | 1/2011 | Sprenger | 424/93.45 |
| 2011/0039010 | A1* | 2/2011 | Rein et al. | 426/607 |
| 2011/0142817 | A1* | 6/2011 | Brands et al. | 424/94.6 |
| 2011/0163127 | A1* | 7/2011 | DiBella-Lenaway | 222/145.6 |
| 2011/0195144 | A1* | 8/2011 | Haschke et al. | 426/2 |
| 2011/0250317 | A1* | 10/2011 | Secretin | 426/61 |
| 2011/0287161 | A1* | 11/2011 | Weber et al. | 426/616 |
| 2012/0009269 | A1* | 1/2012 | Weber et al. | 424/520 |
| 2012/0171162 | A1* | 7/2012 | Terragno et al. | 424/93.3 |
| 2012/0184484 | A1* | 7/2012 | Wang et al. | 514/2.5 |
| 2012/0328473 | A1* | 12/2012 | Thomas et al. | 422/22 |
| 2013/0073072 | A1* | 3/2013 | Popp | 700/110 |

FOREIGN PATENT DOCUMENTS

| | | |
|---|---|---|
| WO | WO 2006/130204 A1 | 12/2006 |
| WO | WO 2007/018585 A2 | 2/2007 |
| WO | WO 2008/013749 A1 | 1/2008 |
| WO | WO 2008/021858 | 2/2008 |

OTHER PUBLICATIONS

U.S. Department of Health and Human Services; FDA; CDER; CBER; and ORA, "Guidance for Industry-Sterile Drug Products Produced by Aseptic Processing", Sep. 2004, Pharmaceutical CGMPs.*
FDA, "Clinical Testing of Infant Formulas with respect to Nutritional Suitability for Term Infants", Jun. 1988, Retrieved from the Internet on Nov. 26, 2012 at "www.fda.gov".*
U.S. Department of Health and Human Services; Food and Drug Administration; and Center for Food Safety and Applied Nutrition, "Frequently Ask Questions about FDA's Regulation of Infant Formula", Mar. 2006, Retrived from the Internet on Nov. 26, 2012 at "www.fda.gov".*
U.S. Department of Health and Human Services; and Food and Drug Administration, "Federal Register 61 FR 36153—Current Good Manufacturing Practice and Quality Control Proceedures, Quality Factors, Notification Requirements and Records and Reports for the Production of Infant Formula", Jul. 1996.*
U.S. Food and Drug Administration, Regulations and Information on the Manufacture and Distributioin of Infant Formul, Mar. 2002.*
U.S. Food and Drug Administration, "Guide to Inspecting Computerized Systems in the Food Processing Industry", Mar. 2009, Retrieved from the Internet on Nov. 27, 2012 at "www.fda.gov".*
World Health Organization, "Enterobacter Sakazakii and Other Microorganisms in powered Infant Formula", Feb. 2004, 35th Session of the Codex Committee on Food Hygiene.*
U.S. Food and Drug Administration, "Powered Infant Formula: An Overview of Manufacturing Process", 2003, Retrieved from the Internet on Nov. 26, 2012 at "www.fda.gov".*
National Evaluation Division of Bureau of Nutritional Sciences, Health Products and Food Brand Health Canada, "Good Manufacturing Practices (GMPs) for Infant Formula", 2006.*
U.S. Food and Drug Administration, "21 CFR Part 106—Infant Formula Quality Control Proceedures", Apr. 2004.*
Futuristix, "Nestle's New Infant Formula Facility Uses Wonderwave's ArchestrA for Tight Production Control", Jul. 2006, Food and Beverage-Active Factory, Industrial Application Server, industrial SQL Server, Intouch.*
Codex Alimentarius Commission, "Recommended International Code for Hygienic Practice for Foods for Infants and Children", 1979.*
Lisa Infant Milk, "Needs Addressed by LISA", 2011, Retrieved from the Internet on May 21, 2013 at "www.lisainfantmilk.com".*
Nutrition Evaluation Division, Bureau of Nutritional Sciences Health Products and Food Branch Health Canada, "Good Manufacturing Practices (GMPs) for Infant Formula", 2006.*
Process Control and Instrumentation, GEA Niro A/S, Oct. 1996, pp. 1-4.
Real-time process determination to achieve reproducible coating results, Walter, Aeromatic-Fielder AG, CH-4416 Bubendorf, Apr. 3, 2002, pp. 1-9.
A Programmable Homogenizing System for Enhanced Productivity and Efficiency, Jahn, Amer. Lab. pp. 1-2, (Jun./Jul. 2006).
Use of a Systematic Risk Analysis Method to Improve Safety in the Production of Pediatric Parenternal Nutrition.., Bonnabry, et. al., Qual. Saf. Health Care 14:93-98 (2005).
Computer-aided Engineering Softwares in the Food Industry, Otles, et. al., J. Food Eng., 65:311-315 (2004).
Bovine Lactoferrin and Lactoferrin Derived from Milk: Production and Applications, Tomita, et. al., Biochem. Cell Biol. 80:109-112 (2002).
Development of a Novel Screening Method for the Isolation of Cronobacter . . . , Iversen, et. al., Applied and Env. Microbio., vol. 74, No. 8, pp. 2550-2553 (Apr. 2008).
DHA/ARA Supplemmental Infant Formulas, Author not named, Abreast of our Times, pp. 1-5 (Winter 2003).
Replacing Mother: Imitating Human Breast Milk in the Laboratory, Vallaeys, Cornucopia Inst., pp. 1-7 (Jan. 2008).
FDA 101: Infant Formula, US Food and Drug Administration, www.fda.gov, pp. 1-3 (Dec. 2007).
FDA Field Survey of Powdered Formula Manufacturing, Zink, US Food and Drug Administration, pp. 1-20 (Jul. 21, 2008).
Hungry for Business, Author Unknown, Rockwell Automation, pp. 6-9, (Dec. 2004).
Infant Formula: Second Best but Good Enough, Stehlin, FDA Consumer Magazine, pp. 1-8 (Jun. 1996).
Standardization, Simplification, and Specification, Hardigg, Lecture—Army Industrial College, pp. 1-11 (Jan. 1, 1934).
Low Clump Reconstituion of Powdered Infant Formula, Foley, Purdue Univ., pp. 1-3 (Apr. 15, 2004).
Final Report: The Effect of Pretoria Pasteurisation on Bacterial Contamination . . . , Jeffery, et. al., Univ. of Pretoria, pp. 1-16 (Aug. 2002).
Guidance for Industry, Frequently Asked Questions about FDA's Regulation of Infant Formula, U.S. Dept. Health and Human Srvs., pp. 1-6 (Mar. 1, 2006).
Korea, Republic of Dariy and Products, Phillips, USDA Foreign Agriculture Report, pp. 1-19 (Nov. 21, 2006).

* cited by examiner

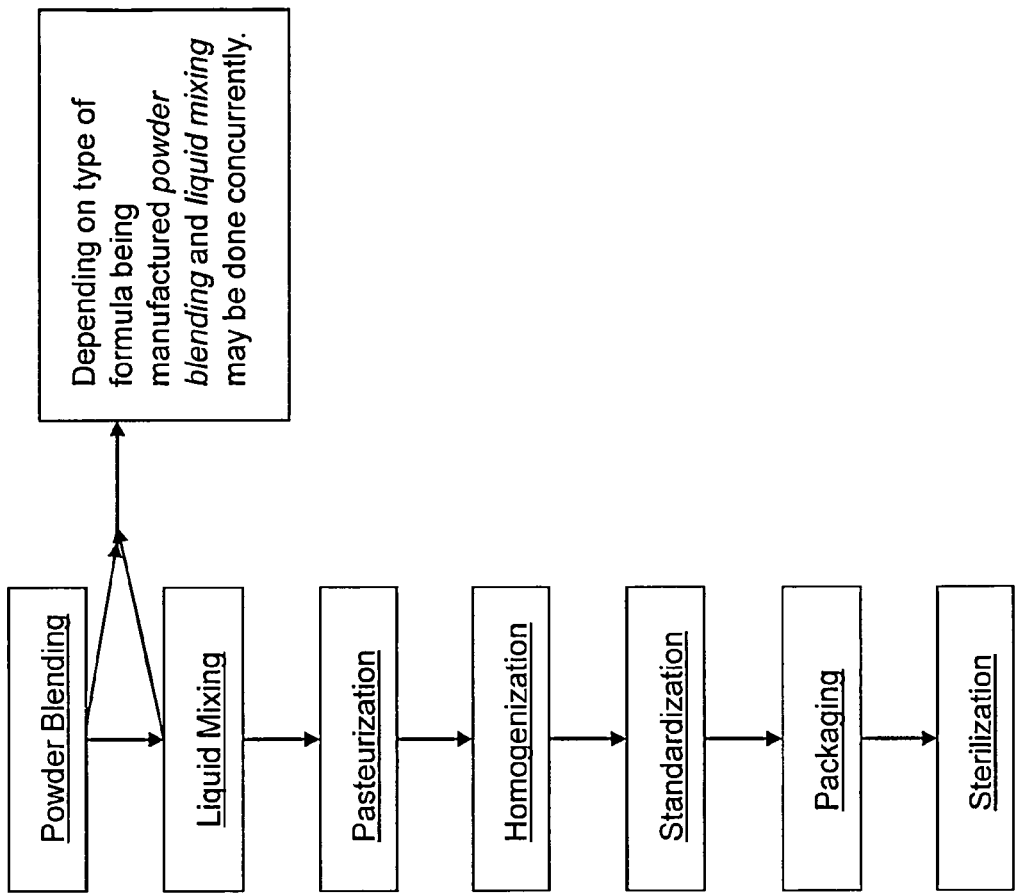
Figure 1: General Schematic of Baby Formula Manufacturing Process

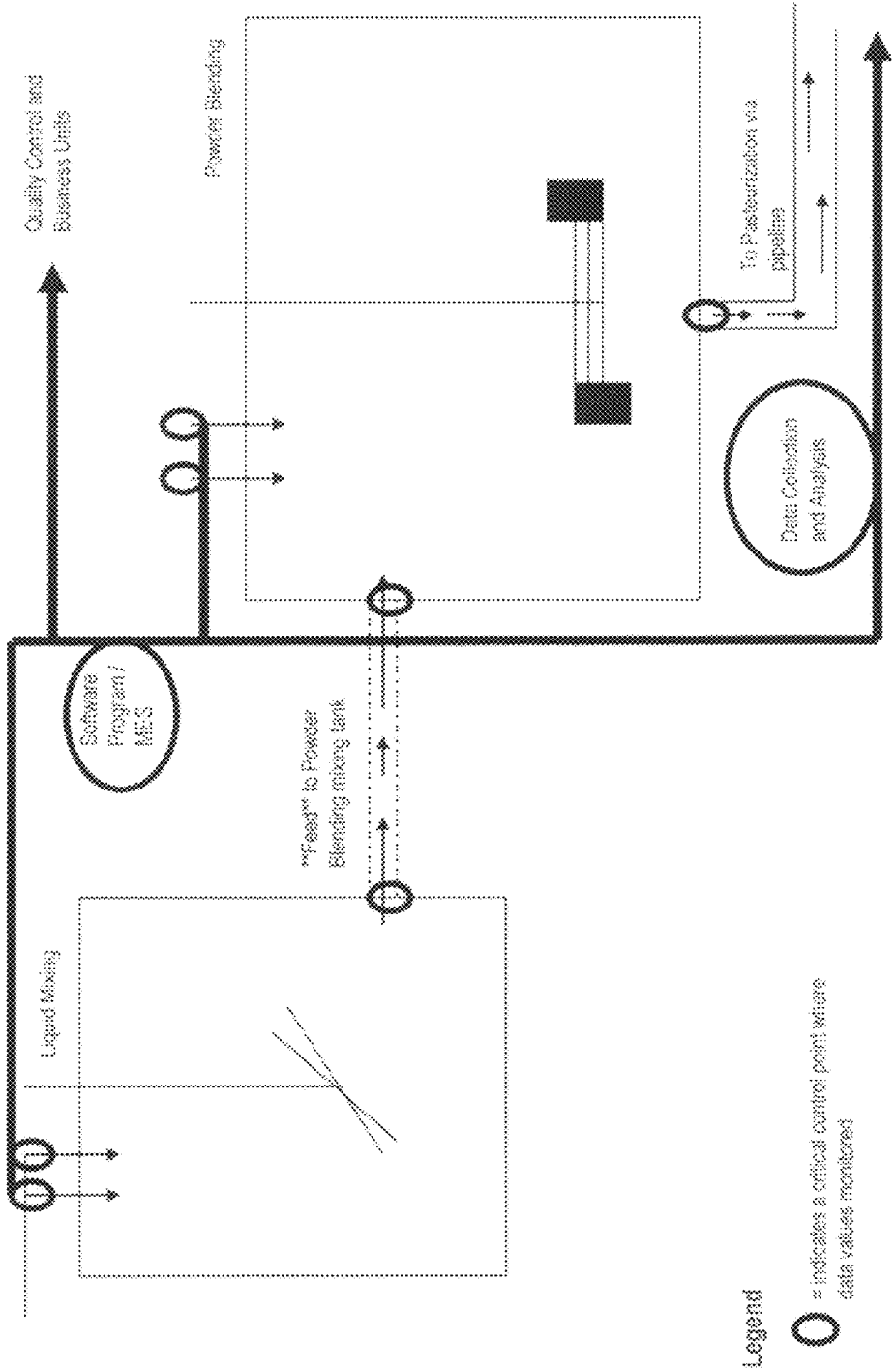

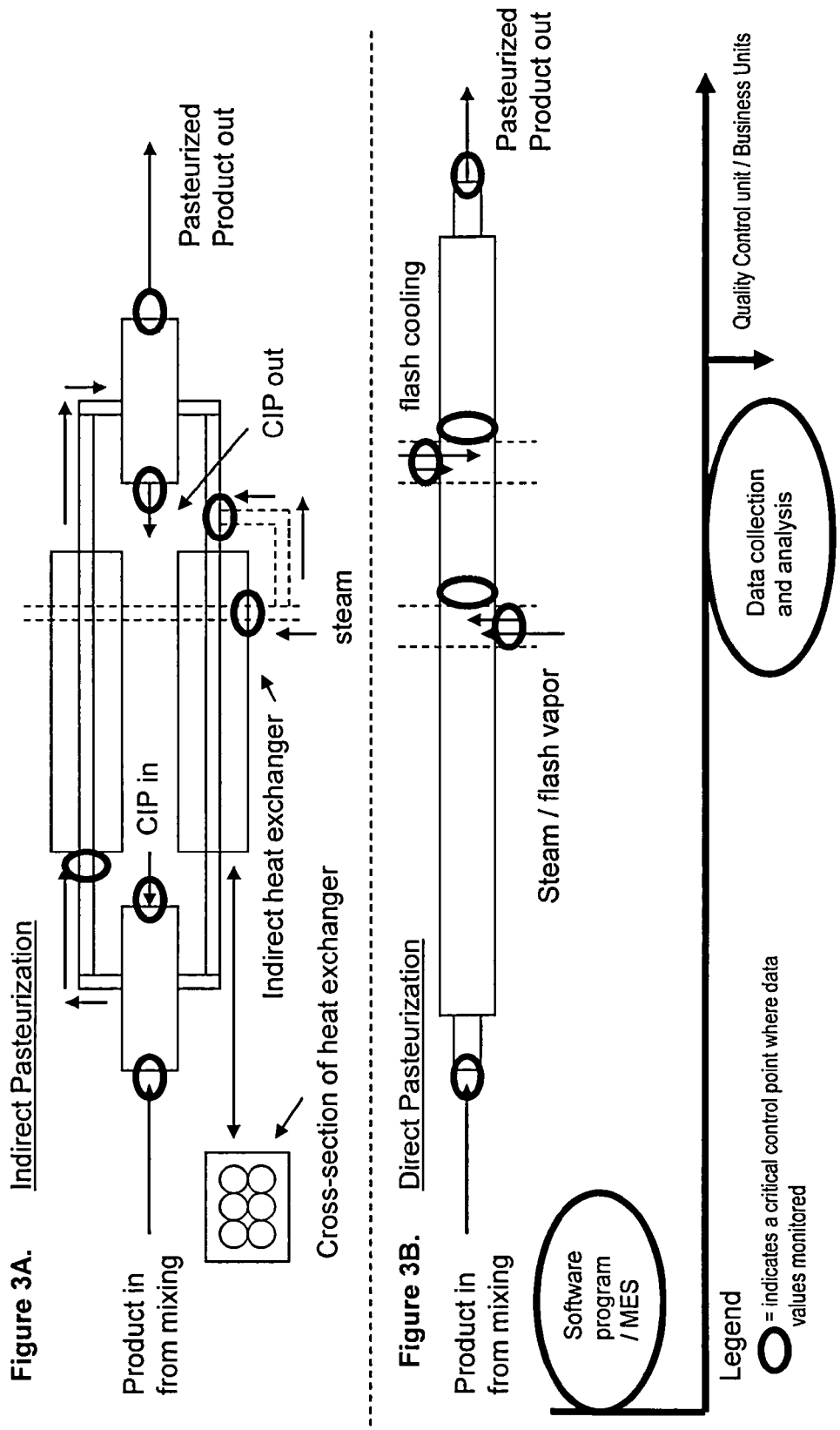
Figure 3: Manufacturing Execution System Integrated into a Baby Formula Pasteurization Process

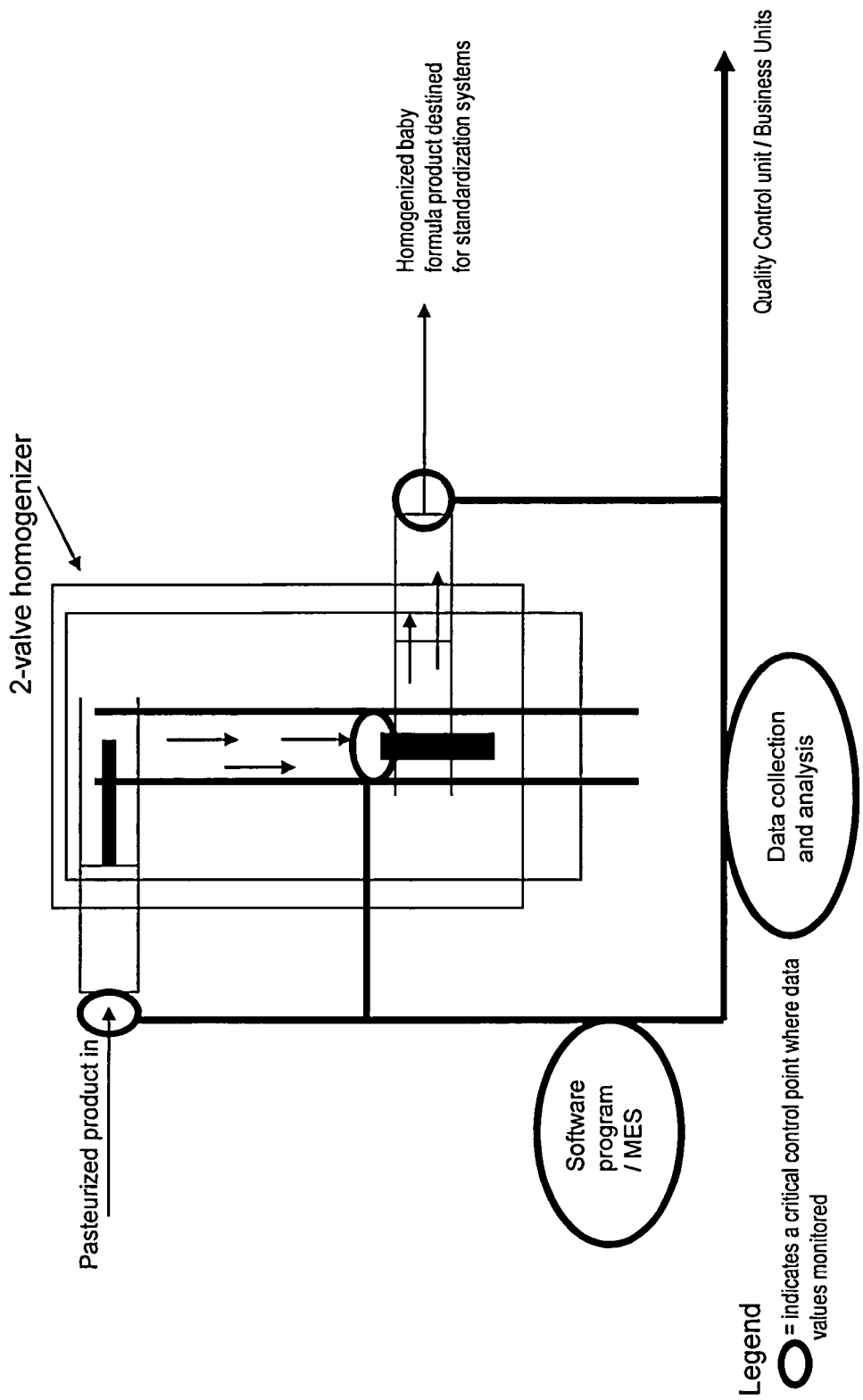
Figure 4: Manufacturing Execution System Integrated into a Baby Formula Homogenization System

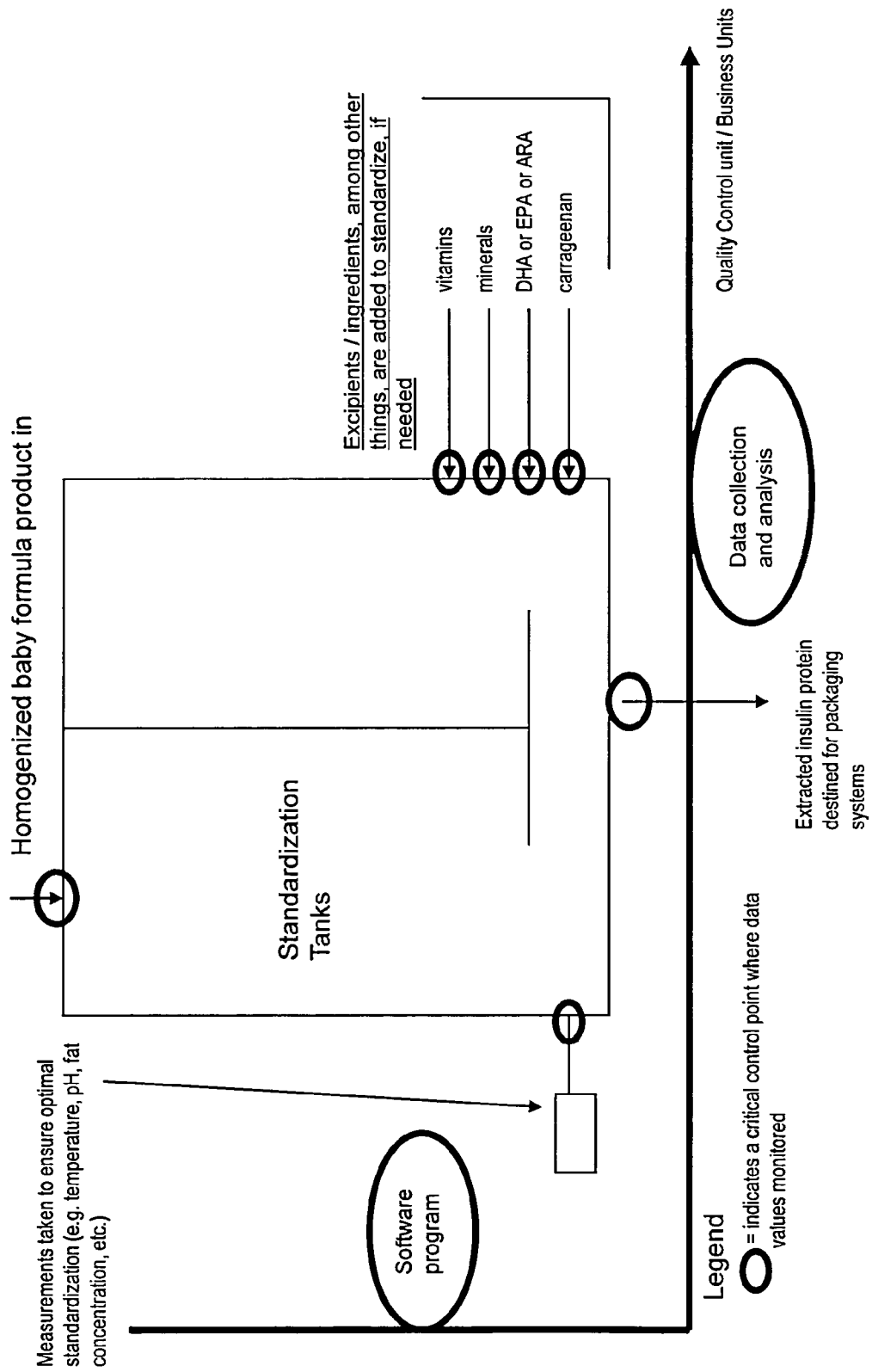
Figure 5: Manufacturing Execution System Integrated into a Baby Formula Standardization System

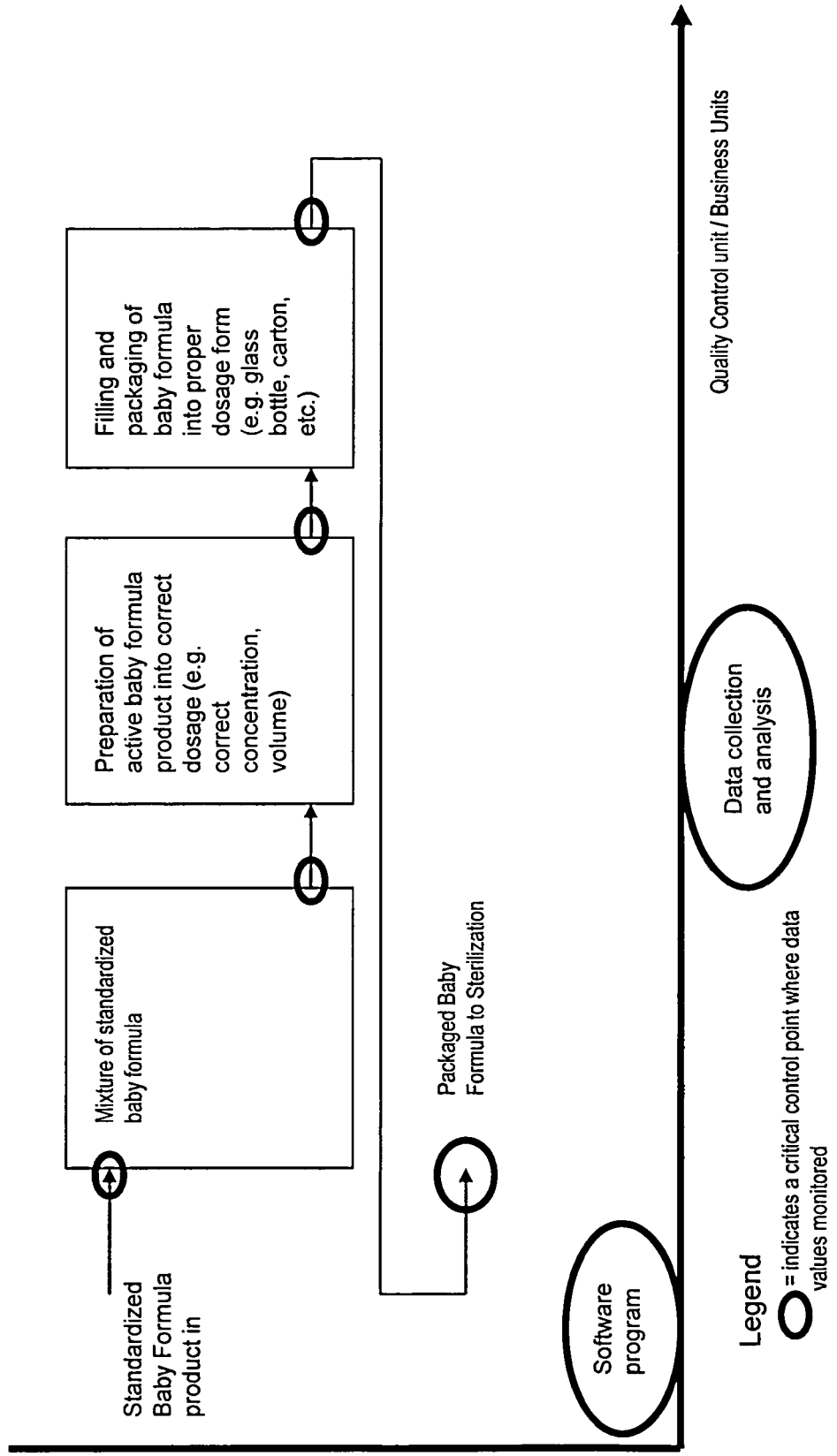
Figure 6: Manufacturing Execution System Integrated into a Baby Formula Packaging System

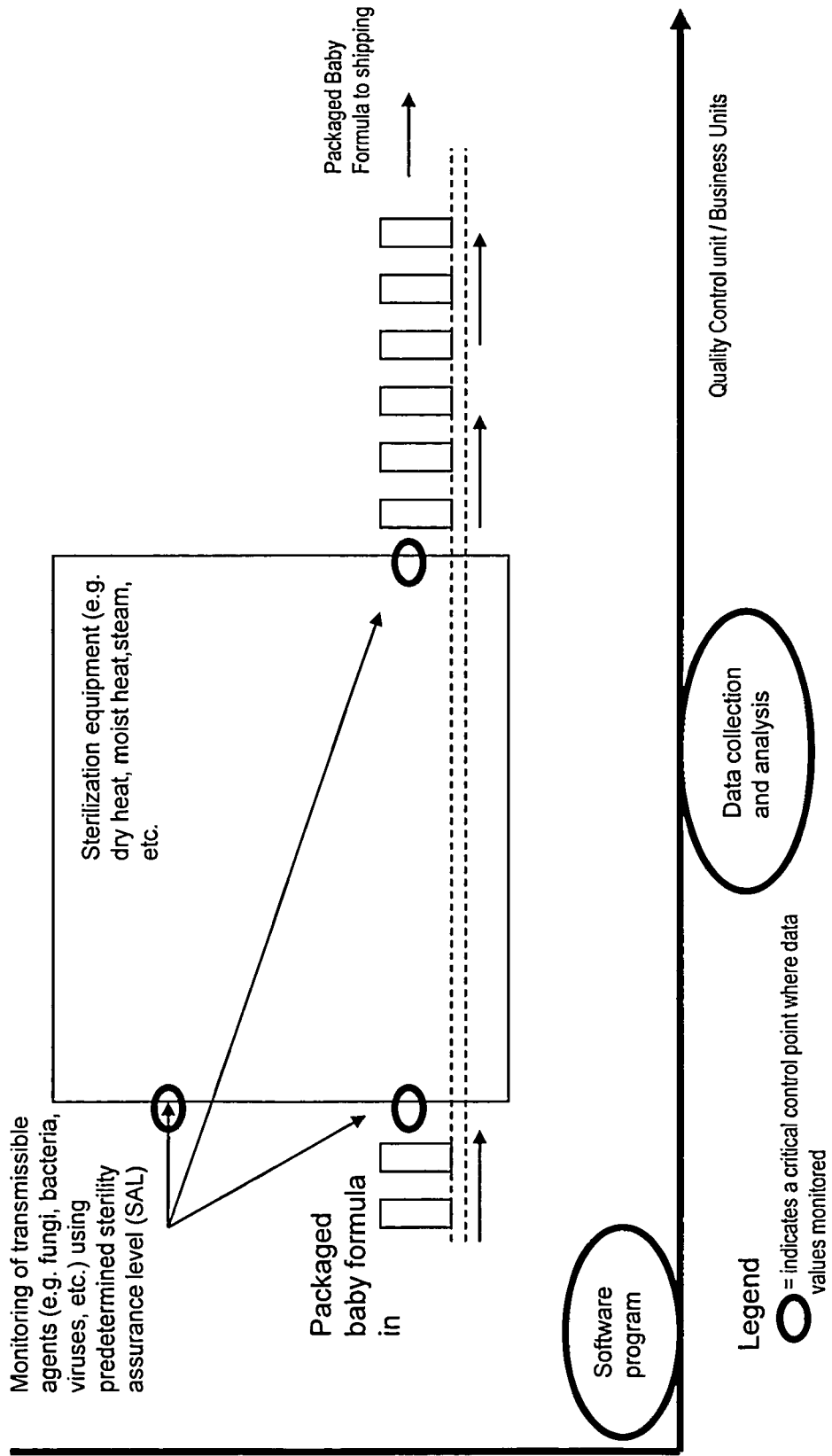
Figure 7: Manufacturing Execution System Integrated into a Baby Formula Sterilization System

MANUFACTURING EXECUTION SYSTEM FOR USE IN MANUFACTURING BABY FORMULA

CROSS-REFERENCE TO RELATED APPLICATIONS

This application claims priority to U.S. Provisional Patent Application No. 61/190,553 filed 29 Aug. 2008, the contents of which are fully incorporated by reference herein.

STATEMENT OF RIGHTS TO INVENTIONS MADE UNDER FEDERALLY SPONSORED RESEARCH

Not applicable.

FIELD OF THE INVENTION

The invention described herein relates to the field of baby formula manufacturing. Specifically, manufacturing execution systems and methods used for the monitoring and execution of baby formula manufacture. The invention further relates to the enhancement of computer system technologies and information technology to produce higher quality more efficient baby formula thereby minimizing cost.

BACKGROUND OF THE INVENTION

Previously we have described novel methods, systems, software programs, and manufacturing execution systems for validation, quality and risk assessment, and monitoring of pharmaceutical manufacturing processes. See, US2005/0251278 published 10 Nov. 2005; US2006/0276923 published 7 Dec. 2006; US2006/0271227 Published 30 Nov. 2006; US2007/0021856 Published 25 Jan. 2007; and US2007/0032897 Published 8 Feb. 2007. Additionally, we endeavor to further the state of the art using software and computer programming in the field of baby formula manufacture.

Baby formula is a synthetic version of mothers' milk and belongs to a class of materials known as dairy substitutes. Dairy substitutes have been used since the early nineteenth century for products like oleomargarine and filled cheese. They are made by blending fats, proteins, and carbohydrates using the same technology and equipment used to manufacture real dairy products. Since the 1940s, advances in processing techniques such as homogenization, fluid blending, and continuous batching and filling have greatly improved the ways imitation dairy products, like formula, are made. The sales of infant formulas have also improved over the last several decades. Until the early 1990s, infant formula was sold only as a pharmaceutical product. Salespeople presented their brands to pediatricians who would then recommend the products to new mothers. In 1992, federal antitrust actions resulted in manufacturers shifting their marketing strategies toward more direct marketing techniques. Now, in addition to pharmaceutical sales, manufacturers rely heavily on direct mail campaigns and TV and print advertising to recruit new customers. In the United States alone, the infant formula industry is a $3 billion a year business with approximately another $1 billion in sales outside of the United States.

Formulas are generally available in three forms: powder, liquid concentrate, and ready-to-feed. Powder and liquid concentrate are less expensive but they require mixing/dilution prior to use. This may be a problem because they may be improperly mixed or mixed with water contaminated with bacteria. Ready-to-feed is the most expensive type but requires no mixing before use. This is an advantage because the mother can be sure the baby is getting the appropriate dose of nutrients and does not have to worry about contamination problems.

Many consumers are under the mistaken impression that the FDA closely and carefully monitors infant formula, perhaps more scrupulously than other foods, since infant-consumers are particularly vulnerable by virtue of their age and total dependence on this one product. In fact, the FDA sets forth only minimal standards regarding the production and sale of synthetic milks. The mandated nutrient requirements for formula are contained in the outdated Infant Formula Act of 1980, which was passed by the U.S. Congress in reaction to a formula-manufacturing error that flooded the market with chloride-deficient formula. Today, manufacturers are required simply to include a relatively short list of ingredients and to record them on the package.

Generally, quality of infant formula is ensured at three levels, which have some degree of overlap. First, in the United States, there are governmental standards, which establish the nutritional quality of infant formulas and other dairy substitutes. Specific details of these standards can be found in the Code of Federal Regulations; more information is available from the Food and Drug Administration (FDA). The FDA publishes a monograph detailing everything from the mandated nutrient list to label copy and artwork used on packaging. Second, the dairy industry sets its own industry-wide quality control standards. The industry is self-policing and has its own regulatory organization, the International Dairy Federation, which sets industry standards for manufacturing and quality control. Third, individual companies set their own standards for quality control. For example, one producer of triglycerides used in formula, has microbiologists and engineers monitor 30 different checkpoints of triglyceride production, 24 hours a day.

As can be seen from the aforementioned, the globalization of baby formula manufacturing requires a global approach to integration keeping in mind the overall objective of strong public health protection. To accomplish these needed goals there is a need to carry out the following actions. The artisan should use emerging science and data analysis to enhance validation and quality assurance programs during the baby formula manufacturing process. From the aforementioned, also apparent to one of ordinary skill in the art is the ability to provide an integrated approach to manufacturing whereby quality and manufacturing variables are monitored continuously during baby formula manufacture. By providing an integrated and user-friendly approach to validation and quality assurance, the overall benefit to the public at-large is end products containing baby formula available at lower costs. This is turn will allow more persons to benefit from innovations that occur in the manufacturing of baby formula.

Given the current deficiencies associated with baby formula manufacture and the fact that the demand from a public health standpoint is increasing, it becomes clear that providing an integrated systems approach to baby formula manufacture is desirable. Specifically, producing baby formula from a "quality by design" approach (i.e. where quality is designed into the production versus testing quality post-production) is advantageous. The present invention provides this solution.

SUMMARY OF THE INVENTION

The invention provides for manufacturing execution systems (denoted herein as manufacturing execution system or
}

MES) and methods thereof designed for use in manufacturing baby formula. Specifically, software programs that monitor quality control and the quality process used in the manufacture, processing, and storing of baby formula. In certain embodiments, the software programs are used in a continuous manner to ensure purity and consistency of an ingredient used in baby formula manufacture.

The invention further comprises a software program that is fully integrated and automated to monitor the entire baby formula manufacturing process.

The invention further comprises integrating a manufacturing execution system into a baby formula manufacturing system whereby control of the baby formula manufacturing process is attained.

In certain embodiments, the MES is integrated into a baby formula liquid mixing system used in baby formula manufacturing.

In certain embodiments, the MES is integrated into a baby formula powder blending system used in baby formula manufacturing.

In certain embodiments, the MES is integrated into a baby formula pasteurization system used in baby formula manufacturing.

In certain embodiments, the MES is integrated into a baby formula standardization system used in baby formula manufacturing.

In certain embodiments, the MES is integrated into a baby formula sterilization system used in baby formula manufacturing.

In certain embodiments, the MES is integrated into a packaging system used in baby formula manufacturing.

In certain embodiments, the manufacturing execution system comprises a software program with a computer memory having computer readable instructions.

In certain embodiments, the manufacturing execution system continuously monitors the baby formula manufacturing process.

In certain embodiments, the manufacturing execution system semi-continuously monitors the baby formula manufacturing process.

Based on the foregoing non-limiting exemplary embodiments, the software program can be interfaced with hardware systems or software systems or devices to monitor quality assurance protocols put in place by the quality control unit.

The invention further comprises a manufacturing execution system which integrates application software and methods disclosed herein to provide a comprehensive validation and quality assurance protocol that is used by a plurality of end users whereby the data compiled from the system is analyzed and used to determine if quality assurance protocols and validation protocols are being achieved.

The invention further comprises implementing the manufacturing execution systems and software program to multiple baby formula product lines whereby simultaneous baby formula production lines are monitored using the same system.

The invention further comprises implementation of the manufacturing execution system and software program described herein into the liquid mixing, powder blending, pasteurization, homogenization, standardization, packaging, and sterilization subset of the baby formula manufacturing process whereby the data compiled by the subset processes is tracked continuously overtime and said data is used to analyze the subset processes and whereby said data is integrated and used to analyze the quality control process of the baby formula manufacturing process at-large.

The invention further comprises a manufacturing execution system, which controls the baby formula manufacturing process, increases productivity, and improves quality of baby formula over time.

BRIEF DESCRIPTION OF THE FIGURES

FIG. 1. General Schematic of a Baby Formula Manufacturing Process. As shown in the figure, the first step is powder blending followed by liquid mixing. The third step is pasteurization followed by homogenization followed by standardization followed by packaging and finally sterilization of the baby formula product. Note, depending on the type of baby formula being manufactured, powder blending and liquid mixing may be completed concurrently.

FIG. 2. Schematic of a Manufacturing execution system integrated into a Baby formula Powder Blending and Liquid Mixing Process. As shown in the figure, the entire baby formula powder blending and liquid mixing system(s) are integrated into a manufacturing execution system. Data is monitored at critical control points to ensure quality parameters are being achieved. The data is monitored and analyzed on a continuous basis. Depending on the type of baby formula that is being manufactured, the powder blending and liquid mixing system(s) may be running in the same mixing tank concurrently.

FIG. 3. Schematic of a Manufacturing execution system integrated into a Baby Formula Pasteurization system used in baby formula manufacture. As shown in FIG. 3A, the entire indirect pasteurization system is integrated into the Manufacturing execution system. Data is monitored at critical control points to ensure quality parameters are being achieved. The data is monitored and analyzed on a continuous basis. As shown in FIG. 3B, the direct pasteurization system is integrated into the Manufacturing execution system. Data is monitored at critical control points to ensure quality parameters are being achieved. The data is monitored and analyzed on a continuous basis.

FIG. 4. Schematic of a Manufacturing execution system integrated into a baby formula homogenization system used in baby formula manufacture. As shown in the figure, the entire baby formula homogenization system is integrated into the Manufacturing execution system. Data is monitored at critical control points to ensure quality parameters are being achieved. The data is monitored and analyzed on a continuous basis.

FIG. 5. Schematic of a Manufacturing execution system integrated into a baby formula standardization system used in baby formula manufacture. As shown in the figure, the entire baby formula standardization system is integrated into the Manufacturing execution system. Data is monitored at critical control points to ensure quality parameters are being achieved. The data is monitored and analyzed on a continuous basis.

FIG. 6. Schematic of a Manufacturing execution system integrated into a baby formula packaging system used in baby formula manufacture. As shown in the figure, the entire baby formula packaging system is integrated into the Manufacturing execution system. Data is monitored at critical control points to ensure quality parameters are being achieved. The data is monitored and analyzed on a continuous basis.

FIG. 7. Schematic of a Manufacturing execution system integrated into a baby formula sterilization system used in baby formula manufacture. As shown in the figure, the entire baby formula sterilization system is integrated into the Manufacturing execution system. Data is monitored at critical control points to ensure quality parameters are being achieved based on predetermined sterility assurance level (SAL). The data is monitored and analyzed on a continuous basis. After sterilization, the baby formula product is destined to shipping.

DETAILED DESCRIPTION OF THE INVENTION

Outline of Sections
I.) Definitions
II.) Software Program and Computer Product
III.) Analysis
IV.) Manufacturing execution system(s)
V.) KITS/Articles of Manufacture
VI.) Background to Baby formula Manufacturing

I.) DEFINITIONS

Unless otherwise defined, all terms of art, notations and other scientific terms or terminology used herein are intended to have the meanings commonly understood by those of skill in the art to which this invention pertains unless the context clearly indicates otherwise. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art, such as, for example, the widely utilized current Good Manufacturing Practice guidelines.

As used herein the term "baby formula" (a.k.a. infant formula, formula) means a synthetic form of mother's milk that belongs to a class of materials known as dairy substitutes.

"interface" means the communication boundary between two or more entities, such as a piece of software, a hardware device, or a user. It generally refers to an abstraction that an entity provides of itself to the outside. This separates the methods of external communication from internal operation, and allows it to be internally modified without affecting the way outside entities interact with it, as well as provide multiple abstractions of itself. It may also provide a means of translation between entities which do not speak the same language, such as between a human and a computer. The interface between a human and a computer is called a user interface. Interfaces between hardware components are physical interfaces. Interfaces between software exist between separate software components and provide a programmatic mechanism by which these components can communicate.

"abstraction" means the separation of the logical properties of data or function from its implementation in a computer program.

"algorithm" means any sequence of operations for performing a specific task.

"algorithm analysis" means a software verification and validation ("V&V") task to ensure that the algorithms selected are correct, appropriate, and stable, and meet all accuracy, timing, and sizing requirements.

"analog" means pertaining to data [signals] in the form of continuously variable [wave form] physical quantities; e.g., pressure, resistance, rotation, temperature, voltage.

"analog device" means a device that operates with variables represented by continuously measured quantities such as pressures, resistances, rotations, temperatures, and voltages.

"analog-to-digital converter" means input related devices, which translate an input device's [sensor] analog signals to the corresponding digital signals needed by the computer.

"analysis" means a course of reasoning showing that a certain result is a consequence of assumed premises.

"application software" means software designed to fill specific needs of a user.

"bar code" means a code representing characters by sets of parallel bars of varying thickness and separation that are read optically by transverse scanning.

"basic input/output system" means firmware that activates peripheral devices in a PC. Includes routines for the keyboard, screen, disk, parallel port and serial port, and for internal services such as time and date. It accepts requests from the device drivers in the operating system as well from application programs. It also contains autostart functions that test the system on startup and prepare the computer for operation. It loads the operating system and passes control to it.

"benchmark" means a standard against which measurements or comparisons can be made.

"block check" means the part of the error control procedure that is used for determining that a block of data is structured according to given rules.

"bootstrap" means a short computer program that is permanently resident or easily loaded into a computer and whose execution brings a larger program, such an operating system or its loader, into memory.

"boundary value" means a data value that corresponds to a minimum or maximum input, internal, or output value specified for a system or component.

"boundary value analysis" means a selection technique in which test data are chosen to lie along "boundaries" of the input domain [or output range] classes, data structures, procedure parameters, etc.

"branch analysis" means a test case identification technique that produces enough test cases such that each decision has a true and a false outcome at least once.

"calibration" means ensuring continuous adequate performance of sensing, measurement, and actuating equipment with regard to specified accuracy and precision requirements.

"certification" means technical evaluation, made as part of and in support of the accreditation process that establishes the extent to which a particular computer system or network design and implementation meet a pre-specified set of requirements.

"concept phase" means the initial phase of a software development project, in which user needs are described and evaluated through documentation.

"configurable, off-the-shelf software" means application software, sometimes general purpose, written for a variety of industries or users in a manner that permits users to modify the program to meet their individual needs.

"control flow analysis" means a software V&V task to ensure that the proposed control flow is free of problems, such as design or code elements that are unreachable or incorrect.

"controller" means hardware that controls peripheral devices such as a disk or display screen. It performs the physical data transfers between main memory and the peripheral device.

"conversational" means pertaining to a interactive system or mode of operation in which the interaction between the user and the system resembles a human dialog.

"corrective maintenance" means maintenance performed to correct faults in hardware or software.

"critical control point" means a function or an area in a manufacturing process or procedure, the failure of which, or loss of control over, may have an adverse affect on the quality of the finished product and may result in an unacceptable health risk.

"data integrity" means the degree to which a collection of data is complete, consistent, and accurate.

"data validation" means a process used to determine if data are inaccurate, incomplete, or unreasonable. The process may include format checks, completeness checks, check key tests, reasonableness checks and limit checks.

"design level" means the design decomposition of the software item; e.g., system, subsystem, program or module.

"design phase" means the period of time in the software life cycle during which the designs for architecture, software components, interfaces, and data are created, documented, and verified to satisfy requirements.

"diagnostic" means pertaining to the detection and isolation of faults or failures.

"dynamic analysis" means analysis that is performed by executing the program code.

"encapsulation" means a software development technique that consists of isolating a system function or a set of data and the operations on those data within a module and providing precise specifications for the module.

"end user" means a person, device, program, or computer system that uses an information system for the purpose of data processing in information exchange.

"error detection" means techniques used to identify errors in data transfers.

"error guessing" means the selection criterion is to pick values that seem likely to cause errors.

"error seeding" means the process of intentionally adding known faults to those already in a computer program for the purpose of monitoring the rate of detection and removal, and estimating the number of faults remaining in the program.

"failure analysis" means determining the exact nature and location of a program error in order to fix the error, to identify and fix other similar errors, and to initiate corrective action to prevent future occurrences of this type of error.

"Failure Modes and Effects Analysis" means a method of reliability analysis intended to identify failures, at the basic component level, which have significant consequences affecting the system performance in the application considered.

"FORTRAN" means an acronym for FORmula TRANslator, the first widely used high-level programming language. Intended primarily for use in solving technical problems in mathematics, engineering, and science.

"life cycle methodology" means the use of any one of several structured methods to plan, design, implement, test and operate a system from its conception to the termination of its use.

"logic analysis" means evaluates the safety-critical equations, algorithms, and control logic of the software design.

"low-level language" means the advantage of assembly language is that it provides bit-level control of the processor allowing tuning of the program for optimal speed and performance. For time critical operations, assembly language may be necessary in order to generate code which executes fast enough for the required operations.

"maintenance" means activities such as adjusting, cleaning, modifying, overhauling equipment to assure performance in accordance with requirements.

"Pascal" means a high-level programming language designed to encourage structured programming practices.

"path analysis" means analysis of a computer program to identify all possible paths through the program, to detect incomplete paths, or to discover portions of the program that are not on any path.

"quality assurance" means the planned systematic activities necessary to ensure that a component, module, or system conforms to established technical requirements.

"quality control" means the operational techniques and procedures used to achieve quality requirements.

"software engineering" means the application of a systematic, disciplined, quantifiable approach to the development, operation, and maintenance of software.

"software engineering environment" means the hardware, software, and firmware used to perform a software engineering effort.

"software hazard analysis" means the identification of safety-critical software, the classification and estimation of potential hazards, and identification of program path analysis to identify hazardous combinations of internal and environmental program conditions.

"software reliability" means the probability that software will not cause the failure of a system for a specified time under specified conditions.

"software review" means an evaluation of software elements to ascertain discrepancies from planned results and to recommend improvement.

"software safety change analysis" means analysis of the safety-critical design elements affected directly or indirectly by the change to show the change does not create a new hazard, does not impact on a previously resolved hazard, does not make a currently existing hazard more severe, and does not adversely affect any safety-critical software design element.

"software safety code analysis" means verification that the safety-critical portions of the design are correctly implemented in the code.

"software safety design analysis" means verification that the safety-critical portion of the software design correctly implements the safety-critical requirements and introduces no new hazards.

"software safety requirements analysis" means analysis evaluating software and interface requirements to identify errors and deficiencies that could contribute to a hazard.

"software safety test analysis" means analysis demonstrating that safety requirements have been correctly implemented and that the software functions safely within its specified environment.

"system administrator" means the person that is charged with the overall administration, and operation of a computer system. The System Administrator is normally an employee or a member of the establishment.

"system analysis" means a systematic investigation of a real or planned system to determine the functions of the system and how they relate to each other and to any other system.

"system design" means a process of defining the hardware and software architecture, components, modules, interfaces, and data for a system to satisfy specified requirements.

"top-down design" means pertaining to design methodology that starts with the highest level of abstraction and proceeds through progressively lower levels.

"validation" means establishing documented evidence which provides a high degree of assurance that a specific process will consistently produce a product meeting its predetermined specifications and quality attributes.

"validation, process" means establishing documented evidence which provides a high degree of assurance that a specific process will consistently produce a product meeting its predetermined specifications and quality characteristics.

"validation, prospective" means validation conducted prior to the distribution of either a new product, or product made under a revised manufacturing process, where the revisions may affect the produces characteristics.

"validation protocol" means a written plan stating how validation will be conducted, including test parameters, product characteristics, production equipment, and decision points on what constitutes acceptable test results.

"validation, retrospective" means validation of a process for a product already in distribution based upon accumulated production, testing and control data. Retrospective validation can also be useful to augment initial premarket prospective validation for new products or changed processes. Test data is useful only if the methods and results are adequately specific. Whenever test data are used to demonstrate conformance to specifications, it is important that the test methodology be qualified to assure that the test results are objective and accurate.

"validation, software" means. determination of the correctness of the final program or software produced from a development project with respect to the user needs and requirements. Validation is usually accomplished by verifying each stage of the software development life cycle.

"structured query language" means a language used to interrogate and process data in a relational database. Originally developed for IBM mainframes, there have been many implementations created for mini and micro computer database applications. SQL commands can be used to interactively work with a data base or can be embedded with a programming language to interface with a database.

"Batch" means a specific quantity of baby formula that is intended to have uniform character and quality, within specified limits, and is produced according to a single manufacturing order during the same cycle of manufacture.

"Component" means any ingredient intended for use in the manufacture of baby formula, including those that may not appear in such baby formula product.

"Baby formula product" means a finished dosage form, for example, tablet, capsule, solution, powder etc. that contains an active baby formula ingredient generally, but not necessarily, in association with inactive ingredients.

"Active baby formula ingredient" means any component that is an important dietary requirement for infants and is a primary ingredient in baby formula. An active baby formula ingredient includes, but is not limited to, proteins, fats, oils, vitamins, and minerals. For the avoidance of doubt, an active baby formula ingredient is not intended to be an inactive ingredient.

"Inactive ingredient" (a.k.a. excipient) means a substance used as a carrier for the active ingredients of a baby formula product. In addition, excipients can be used to aid the process by which baby formula is manufactured. The active baby formula ingredient is then dissolved or mixed with an excipient. Excipients are also sometimes used to bulk up formulations with active baby formula ingredients, to allow for convenient and accurate dosage. Examples of excipients, include but are not limited to, thickeners, binders, starches, gums, dilutents, flavors, colors, emulsifiers, and preservatives.

"In-process material" means any material fabricated, compounded, blended, or derived by chemical reaction that is produced for, and used in, the preparation of the baby formula product.

"Lot number, control number, or batch number" means any distinctive combination of letters, numbers, or symbols, or any combination thereof, from which the complete history of the manufacture, processing, packing, holding, and distribution of a batch or lot of baby formula product or active baby formula ingredient or other material can be determined.

"Quality control unit" means any person or organizational element designated by the firm to be responsible for the duties relating to quality control.

"Acceptance criteria" means the product specifications and acceptance/rejection criteria, such as acceptable quality level and unacceptable quality level, with an associated sampling plan, that are necessary for making a decision to accept or reject a lot or batch.

"manufacturing execution system" means an integrated hardware and software solution designed to measure and control activities in the production areas of baby formula manufacturing organizations to increase productivity and improve quality. For the purposes of this definition an MES relates only to baby formula manufacturing processes and systems. The use of an MES of the present invention not relating to the manufacturing, storing, or production of baby formula is specifically excluded from the definition of an MES.

"Process analytical technology" (a.k.a. PAT) means a mechanism to design, analyze, and control baby formula manufacturing processes through the measurement of critical process parameters and quality attributes.

"Pasteurization" means the process of heating liquids for the purpose of destroying bacteria, protozoa, molds, and yeasts. The process was named after its creator, French chemist and microbiologist Louis Pasteur.

"Homogenization" means a term connoting a process that makes a mixture the same throughout the entire substance (i.e. homogeneous). Note, for the purposes of this definition, when soft solids are milled in a liquid, this can be seen as a form of homogenization.

"Sterilization" means any process that effectively kills or eliminates transmissible agents (such as fungi, bacteria, viruses, prions, and spore forms, etc.) from a surface, equipment, foods, medications, baby formula, or biological culture medium. Sterilization can be achieved through application of heat, chemicals, irradiation, high pressure or filtration.

II.) Software Program

The invention provides for a software program that is programmed in a high-level or low-level programming language, preferably a relational language such as structured query language, which allows the program to interface with an already existing program or a database. Other programming languages include but are not limited to C, C++, COBOL, FORTRAN, Java, Perl, Python, Smalltalk, Dataflex, PowerBuilder, FOCUS, LINC, Oracle Reports, Quest, Ab Initio, LANSA, PL/SQL, RAMIS, S, SAS, SPSS, APE, Genexus, UNIFACE, CSS, ColdFusion, and MS visual basic.

In addition, the invention provides for a fifth-generation programming language ("5GL") based around solving problems using constraints given to the program, rather than using an algorithm written by a computer programmer. Essentially, a 5GL of the present invention is designed to make the computer solve the problem (i.e. higher quality more efficient baby formula production). This way, a programmer only needs to worry about what problems need to be solved and what conditions need to be met, without worrying about how to implement a routine or algorithm to solve them. In one embodiment, a 5GL of the present invention uses Prolog, OPS5, or Mercury programming language.

It will be readily apparent to one of skill in the art that the preferred embodiment will be a software program that can be easily modified to conform to numerous software-engineering environments. One of ordinary skill in the art will understand and will be enabled to utilize the advantages of the invention by designing the system with top-down design. The level of abstraction necessary to achieve the desired result will be a direct function of the level of complexity of the process that is being monitored.

The invention further comprises computer software which comprises three (3) layers. It will be appreciated by one of ordinary skill in the art that the three (3) layers may overlap and may or may not be distinct layers. The invention comprises a system software layer, which helps run the computer system. The system software layer of the invention comprises, operating systems, device drivers, diagnostic tools, servers, windowing systems, and other utilities. The purpose of systems software is to insulate the applications programmer as much as possible from the details of the particular computer complex being used, especially memory and other hardware features, and such as accessory devices as communications, printers, readers, displays, keyboards, etc.

The invention comprises computer software containing a programming software layer, which provides tools to assist a programmer to use programming languages in a more convenient way. These tools include but are note limited to, text editors, compilers, interpreters, linkers, debuggers, and so forth. An Integrated development environment (IDE) merges those tools into a software bundle, and a programmer may not need to type multiple commands for compiling, interpreting, debugging, tracing, and etc., especially if the IDE has an advanced graphical user interface.

The invention comprises computer software containing an application software layer which allows end users to accomplish one or more specific (non-computer related) tasks.

In one embodiment, the invention comprises an embedded system designed to perform one or a few dedicated functions, often with real-time computing constraints. It is usually embedded as part of a complete device including hardware and mechanical parts. In a preferred embodiment, the embedded system of the invention is embedded in baby formula manufacturing hardware systems and mechanical parts.

One of ordinary skill will appreciate that to maximize results the ability to amend the algorithm needed to conform to the validation and QA standards set forth by the quality control unit on each step during baby formula manufacture will be preferred. This differential approach to programming will provide the greatest level of data analysis leading to the highest standard of data integrity.

The preferred embodiments may be implemented as a method, system, or program using standard software programming and/or engineering techniques to produce software, firmware, hardware, or any combination thereof. The term "computer product" as used herein is intended to encompass one or more computer programs and data files accessible from one or more computer-readable devices, firmware, programmable logic, memory devices (e.g. EEPROM's, ROM's, PROM's, RAM's, SRAM's, etc.) hardware, electronic devices, a readable storage diskette, CD-ROM, a file server providing access to programs via a network transmission line, wireless transmission media, signals propagating through space, radio waves, infrared signals, etc.

The invention further provides articles (e.g., computer products) comprising a machine-readable medium including machine-executable instructions, computer systems and computer implemented methods to practice the methods of the invention. Accordingly, the invention provides computers, computer systems, computer readable mediums, computer programs products and the like having recorded or stored thereon machine-executable instructions to practice the methods of the invention. As used herein, the words "recorded" and "stored" refer to a process for storing information on a computer medium. A skilled artisan can readily adopt any known methods for recording information on a computer to practice the methods of the invention.

The computer processor used to practice the methods of the invention can be a conventional general-purpose digital computer, e.g., a personal workstation computer, including conventional elements such as microprocessor and data transfer bus.

Preferably, the program will be initiated in parallel with the baby formula manufacturing process or quality assurance ("QA") protocol. This will allow the ability to monitor the baby formula manufacturing and QA process from its inception. However, in some instances the program can be bootstrapped into an already existing program that will allow monitoring from the time of execution (i.e. bootstrapped to configurable off-the-shelf software).

For example, the critical control point for monitoring an active baby formula ingredient versus an inactive ingredient may not be equivalent. Similarly, the critical control point for monitoring an in-process material may vary from component to component and often from batch to batch.

In one embodiment, the invention provides for methods of interfacing a software program with a baby formula manufacturing system whereby the software program is integrated into the baby formula manufacturing process and control of the baby formula manufacturing process is attained. The integration can be used for routine monitoring, quality control, maintenance, hazard mitigation, validation, etc.

The invention further comprises implementing the software program to multiple devices used in baby formula manufacture to create a manufacturing execution system used to monitor and control the entire baby formula manufacturing process.

The invention further comprises implementing the manufacturing execution system into multiple baby formula product lines whereby simultaneous baby formula production lines are monitored using the same system.

The invention further comprises implementation of the manufacturing execution system and software program described herein into the subset of the baby formula manufacturing process whereby the data compiled by the liquid mixing, powder blending, pasteurization, homogenization, standardization, packaging, and sterilization subset processes is tracked continuously overtime and said data is used to analyze the subset processes and whereby said data is integrated and used to analyze the quality control process of the baby formula manufacturing process at-large.

It will also be appreciated by those skilled in the art that the various steps herein for baby formula production are not required to be all performed or exist in the same production series. Thus, while in some embodiments, all steps and/or software programs and/or manufacturing execution systems described or mentioned herein are performed or exist, in other embodiments, one or more steps are optionally, e.g., omitted, changed (in scope, order, placement, etc.) or the like. Accordingly, those of skill in the art will recognize that many modifications may be made without departing from the scope of the present invention.

III.) Analysis

The invention provides for a method of analyzing data that is compiled as a result of the manufacturing of baby formula. Further the invention provides for the analysis of data that is compiled as a result of a QA program used to monitor the manufacture of baby formula in order to maintain the highest level of data integrity. In one embodiment, the parameters of the data will be defined by the quality control unit. Generally, the quality control unit will provide endpoints that need to be achieved to conform to cGMP regulations or in some instances an internal endpoint that is more restrictive to the minimum levels that need to be achieved.

In a preferred embodiment, the invention provides for data analysis using boundary value analysis. The boundary value will be set forth by the quality control unit. Using the boundary values set forth for a particular phase of baby formula manufacture the algorithm is defined. Once the algorithm is defined, an algorithm analysis (i.e. logic analysis) takes place. One of skill in the art will appreciate that a wide variety of tools are used to confirm algorithm analysis such as an accuracy study processor.

One of ordinary skill will appreciate that different types of data will require different types of analysis. In a further embodiment, the program provides a method of analyzing block data via a block check. If the block check renders an affirmative analysis, the benchmark has been met and the analysis continues to the next component. If the block check renders a negative, the data is flagged via standard recognition files known in the art and a hazard analysis and hazard mitigation occurs.

In a further embodiment, the invention provides for data analysis using branch analysis. The test cases will be set forth by the quality control unit.

In a further embodiment, the invention provides for data analysis using control flow analysis. The control flow analysis will calibrate the design level set forth by the quality control unit, which is generated in the design phase.

In a further embodiment, the invention provides for data analysis using failure analysis. The failure analysis is initiated using the failure benchmark set forth by the quality control unit and then using standard techniques to come to error detection. The preferred technique will be top-down. For example, error guessing based on quality control group parameters, which are confirmed by error seeding.

In a further embodiment, the invention provides for data analysis using path analysis. The path analysis will be initiated after the design phase and will be used to confirm the design level. On of ordinary skill in the art will appreciate that the path analysis will be a dynamic analysis depending on the complexity of the program modification. For example, the path analysis on the output of a baby formula product will be inherently more complex that the path analysis for the validation of an in-process material. However, one of ordinary skill will understand that the analysis is the same, but the parameters set forth by the quality control unit will differ.

In a further embodiment, the invention provides for data analysis using failure modes and effects analysis. The analysis of actual or potential failure modes within a baby formula manufacturing system on a component-by-component and process by process level is analyzed for classification or determination of a failure upon the baby formula manufacturing system. Failures which cause any error or defects in a baby formula process, design, manufacture, or product are analyzed and corrective action is taken during baby formula manufacture. The corrective action of the invention comprises modifying or stopping baby formula manufacture to obviate a failure.

In a further embodiment, the invention provides for data analysis using root cause analysis. The analysis occurs by identifying a root cause of a failure or hazard with the intention of eliminating the root cause thereby reducing its frequency on future baby formula batches.

In a further embodiment, the invention provides for data analysis using hazard analysis and critical control points. The analysis occurs in a systematic preventive approach to baby formula manufacturing that addresses physical, chemical, and biological hazards of baby formula as a means of prevention rather than finished baby formula product inspection.

The analysis is used in baby formula manufacture to identify hazards, so that key actions and locations within a baby formula manufacturing process, known as critical control points can be taken to reduce or eliminate the risk of the hazards being realized. The analysis is used at all stages of baby formula production including liquid mixing, powder blending, pasteurization, homogenization, standardization, packaging, and sterilization. Failures which cause any error or defects in a baby formula process, design, manufacture, or product are analyzed and corrective action is taken during baby formula manufacture. The corrective action of the invention comprises modifying or stopping baby formula manufacture to obviate a failure.

The invention provides for a top-down design to software analysis. This preferred embodiment is advantageous because the parameters of analysis will be fixed for any given process and will be set forth by the quality control unit. Thus, performing software safety code analysis then software safety design analysis, then software safety requirements analysis, and then software safety test analysis will be preferred.

The aforementioned analysis methods are used for several non-limiting embodiments, including but not limited to, validating QA software, validating baby formula manufacturing processes and systems, and validating process designs wherein the integration of the system design will allow for more efficient determination of acceptance criteria in a batch, in-process material, batch number, control number, and lot number and allow for increased access time thus achieving a more efficient cost-saving baby formula manufacturing process.

IV. Manufacturing Execution System(s)

In one embodiment, the software program or computer product, as the case may be, is integrated into a manufacturing execution system that controls the baby formula manufacturing process. The tools of the manufacturing execution system of the invention focus on less variance, higher volumes, tighter control, and logistics of baby formula manufacturing. One of ordinary skill in the art will understand that a MES of the invention posseses attributes to increase traceability, productivity, and quality of a baby formula product. One of ordinary skill in the art will understand that the aforementioned attributes are achieved by monitoring such baby formula manufacturing functions including, for example, equipment tracking, product genealogy, labor and item tracking, costing, electronic signature capture, defect and resolution monitoring, executive dashboards, and other various reporting functions.

It will be understood by one of skill in the art that the software programs or computer products integrates the hardware via generally understood devices in the art (i.e. attached to the analog device via an analog to digital converter).

The software program or computer product is integrated into the manufacturing execution system on a device-by-device basis. As previously set forth, the acceptance criteria of all devices used in baby formula manufacture for the purposes of the manufacturing execution system are determined by the quality control unit. The analysis of the baby formula manufacturing occurs using any of the methods disclosed herein. (See, section III entitled "Analysis"). The program monitors and processes the data and stores the data using standard methods. The data is provided to an end user or a plurality of end users for assessing the quality of data generated by the device or devices. Furthermore, the data is stored for comparative analysis to previous batches to provide a risk-based assessment in case of failure. Using the historical analysis will provide a more streamlined baby formula manufacturing process and will monitor to ensure that product quality is maximized. Utilizing the historical record will provide baby formula manufacturers an "intelligent" perspective to manufacturing. Over time, the manufacturing execution system will teach itself and modify the baby formula manufacturing process in a way to obviate previous failures while at the same time continuously monitoring for new or potential failures. In addition, the invention comprises monitoring the data from initial process, monitoring the data at the end process, and monitoring the data from a routine maintenance schedule to ensure the system maintain data integrity and validation standards predetermined by the quality control unit.

V.) Kits/Articles of Manufacture

For use in basic input/output systems, hardware calibrations, software calibrations, computer systems audits, computer system security certification, data validation, different software system analysis, quality control, and the manufacturing of baby formula products described herein, kits are within the scope of the invention. Such kits can comprise a carrier, package, or container that is compartmentalized to receive one or more containers such as boxes, shrink wrap, and the like, each of the container(s) comprising one of the separate elements to be used in the method, along with a program or insert comprising instructions for use, such as a use described herein.

The kit of the invention will typically comprise the container described above and one or more other containers associated therewith that comprise materials desirable from a commercial and user standpoint, programs listing contents and/or instructions for use, and package inserts with instructions for use.

A program can be present on or with the container. Directions and or other information can also be included on an insert(s) or program(s) which is included with or on the kit. The program can be on or associated with the container.

The terms "kit" and "article of manufacture" can be used as synonyms.

The article of manufacture typically comprises at least one container and at least one program. The containers can be formed from a variety of materials such as glass, metal or plastic.

VI.) Background to Baby Formula Manufacturing

Baby formula is a synthetic version of mothers' milk and belongs to a class of materials known as dairy substitutes. Dairy substitutes are made by blending fats, proteins, and carbohydrates using the same technology and equipment used to manufacture real dairy products. The design of infant formulas is highly complex due to the nature of the biological requirements of the developing child. The key to successful formula design is to match as closely as possible the physical and nutritional properties of breast milk. Milk is a natural emulsion, which means it is a fine dispersion of tiny droplets of fats and oils suspended in water. Milk also contains important components including proteins, sugars, minerals, salts, and trace elements. Formula is made by blending similar materials in an attempt to match the characteristics of true milk. Formula design typically falls into one of three categories: milk-based formula, animal or vegetable based formula, or non-milk based.

Milk based formulas typically start with cow milk as a base since most infants have no problem ingesting cow's milk. This type of formula is fortified with extra nutritional elements.

Animal or vegetable-based formula is produced, mainly because some infants have a sensitivity, allergy, or potential allergy to formula based entirely on cow's milk. Formula made with vegetable derived milk or a limited amount of cow's milk derived components may be more suitable for these children. Most vegetable derived formulas are soybean based. However, allergies to soybean milk also exist, so this approach does not guarantee the product will be trouble free. In general, using hydrolyzed proteins can minimize allergy concerns. They are less likely to cause allergic reactions.

Non-milk based formulas are expensive, specialty formulas for infants who have a strong sensitivity to both cow's and soy milk, or other medical or digestive conditions that are formula related.

Generally, formulas are available in three forms: powder, liquid concentrate, and ready-to-feed. Powder and liquid concentrate are less expensive but they require mixing/dilution prior to use. This may be a problem because they may be improperly mixed or mixed with water contaminated with bacteria. Ready-to-feed is the most expensive type but requires no mixing before use. This is an advantage because the mother can be sure the baby is getting the appropriate dose of nutrients and does not have to worry about contamination problems.

In general, baby formula contains the following raw material: proteins, fats, carbohydrates, diluents, minerals, vitamins, emulsifiers, and stabilizers. As described above, protein used in formulas can come from a variety of sources such animal milk or soybeans. Soymilk is made by taking soybeans, soaking them in baking soda, draining them, grinding the beans, then diluting the mixture with water and homogenizing it. The proteins, which come from soybeans, may be in the form of protein concentrates or protein isolates. The latter helps eliminate or reduce carbohydrates that can cause flatulence and abnormal stools. Other useful proteins can be derived from nuts, fish, and cottonseed oil but these have limited application in infant formulas.

Fats and oils are an important dietary requirement for infants. Therefore, formulations attempt to match the serum fatty acid profile of real breast milk. These fatty acids include eicosapentaenoic acid (EPA) which may be derived from fish oil and other sources and ARA (arachidonic acid). In actual breast milk there is a significant amount of fatty compounds known as triglycerides. For example, docosahexaenoic acid (DHA) is believed to be an important triglycerides. Triglycerides which are similar to (but not biochemically identical to) those found in breast milk can be derived from egg yolk phospholipids. Alternatively, fatty acid precursors (molecules that react to form dietary fatty acids) may be added to infant formula. These precursors (e.g., alpha and gamma linolenic acid) allow the infants' bodies to synthesize the necessary fatty acids. However, this method is not as efficient for delivering fatty acids as breast milk is.

The diluents are the carrier or bulk of the liquid of the formula. For milk-based formulations, skim milk may be used as the primary diluents. In milk free formulations, purified water is used.

In addition, a number of essential minerals are added to infant formula. These include calcium, phosphate, sodium, potassium, chloride, magnesium; sulfur, copper, zinc, iodine, and iron. Iron is one of the most important components since all babies need a source of iron in their diet. Some parents are concerned that iron-fortified formulas cause intestinal problems in infants but this is a myth. In general, parents can expect formula fed babies to experience more gastrointestinal problems than breastfed babies.

Additionally, vitamins are added to increase the nutritional value of formula. These include vitamins A, B12, C, D, and E as well as thiamine, riboflavin, niacin, pyridoxine, pantothenate, and folacin.

Finally, a variety of materials are added to ensure the formula stays homogenous and that the oil and water-soluble components do not separate. These include emulsifiers such as mono and di-glycerides as well as thickeners like natural starches and gums (e.g., such carrageenan.).

Using the aforementioned ingredients, the manufacturing of baby formula is completed using the following process (note, the process may be altered depending on the type of baby formula being manufactured). The first step in the process is mixing the ingredients. Generally, the primary ingredients are blended (powder) and mixed (liquid) in large stainless steel tanks. Skim milk is then added and adjusted to about 130° F.-150° F., preferably 140° F. (60° C.). Fats, oils and emulsifiers are then added. Additional heating and mixing may be required to yield the proper consistency set forth by the quality control unit. In addition, minerals, vitamins, and stabilizing gums may be added at various points in the process depending on their sensitivity to heat and other ingredients. Once mixing is complete, a batch is temporarily stored or transported via pipeline to pasteurization equipment.

Pasteurization is a process that protects against spoilage by eliminating bacteria, yeasts, and molds. Pasteurization involves quickly heating and cooling the baby formula product under controlled conditions which microorganisms cannot survive. Generally, a temperature of 185-201.2° F. (85-94° C.), held for about 30 seconds, is necessary to adequately reduce microorganisms and prepare the baby formula for filling. Several pasteurization methods are commercially available in the art. One common method warms the formula by sending it through a tube adjacent to heat plate heat exchanger. Thus, the formula is heated indirectly. Another method heats formula directly and then uses the heated liquid to preheat the rest of the incoming formula. The preheated formula is further heated with steam or hot water to the pasteurization temperature. After pasteurization is complete, a batch is processed further by homogenization.

Homogenization is a process, which increases emulsion uniformity and stability by reducing the size of the fat and oil particles in the baby formula. This process can be done with a variety of mixing equipment known in the art, which applies high shear to the product. This type of mixing breaks the fat and oil particles into very small droplets.

Once the baby formula has been homogenized, the next step is standardization. During the standardization step, the resulting baby formula composition is standardized to ensure key parameters, such as pH, fat concentration, and vitamin(s) and mineral(s) are correct (generally against the previously set forth quality parameters provided by the quality control unit). If any of these ingredients are at insufficient levels (i.e. outside quality parameters), the baby formula batch can be reworked to achieve the appropriate levels. The batch is then ready to be packaged.

The baby formula packaging process depends on the manufacturer and type of equipment employed, but in general, the liquid formula is filled into metal cans which have lids crimped into place and powdered baby formula is put into plastic or paper-based containers. These can be filled on conventional liquid or powder filling equipment known in the art.

Finally, the baby formula product filled packages are subsequently sterilized (i.e. heated and cooled to destroy any additional microorganisms). The finished cans are then packed in cartons and stored for shipping.

EXAMPLES

Various aspects of the invention are further described and illustrated by way of the several examples that follow, none of which is intended to limit the scope of the invention.

Example 1

Utilizing the Manufacturing Execution System to Monitor a Baby formula Powder Blending and Liquid Mixing Process for Baby Formula Manufacture Dry powder blending is one of the most widely used techniques in baby formula manufacturing. One of skill in the art will appreciate that agitating a batch may not result in a homogeneous blend. Moreover, uniform blending may cause the ingredients to separate into layers. It is an object of the present invention to remedy these deficiencies.

Additionally, at first glance, liquid mixing of baby formula would seem very straightforward. One of ordinary skill in the art will appreciate the complexities associated with liquid mixing in the baby formula manufacturing process. For example, mixing dissimilar liquids such as oil and water or mixing chemicals that harden are problems encountered on a daily basis. An object of the invention is to remedy these deficiencies.

Generally speaking and for purposes of this example, manufacturers begin with raw materials such as proteins that come from a variety of sources, such as aminal milk or soybeans, fats, carbohydrates, dilutents, vitamins, minerals, and a variety of excipients. Depending on the type of baby formula being made, the raw materials are mixed in either a liquid mixing or powder blending system (FIG. 2). It should be noted, that in one embodiment of the invention, the powder blending and liquid mixing processes are run on the same system. The raw materials are mixed to predetermined properties and then shipped via pipeline to pasteurization systems. (FIG. 2).

In one embodiment, the Manufacturing execution system ("MES") is integrated into the baby formula powder blending system used in baby formula manufacture. In a further embodiment, the Manufacturing execution system ("MES") is integrated into the baby formula liquid mixing system used in baby formula manufacture. It will be understood by one of skill in the art that the MES integrates the hardware via generally understood devices in the art (i.e. attached to the analog device via an analog to digital converter). The MES is integrated into the baby formula powder blending and/or liquid mixing system on a device-by-device basis. As previously set forth, the acceptance criteria of all devices used in the baby formula manufacture for the purposes of the baby formula powder blending and/or liquid mixing processes are determined by the quality control unit. The analysis of the software and hardware occurs using any of the methods disclosed herein. The MES monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined baby formula liquid mixing and/or powder blending process and will monitor to ensure that the baby formula powder blending and/or liquid mixing system(s) data is integrated into subsequent baby formula manufacturing processes and systems.

In addition, the invention comprises monitoring the data from initial liquid mixing and/or powder blending processes, monitoring the data at the end liquid mixing and/or powder blending processes, and monitoring the data from a routine maintenance schedule to ensure the liquid mixing and/or powder blending system(s) maintain data integrity and validation standards predetermined by the quality control unit. (See, FIG. 2).

In one embodiment, the monitoring and analysis of the baby formula liquid mixing and/or powder blending systems achieves a step of integration into a manufacturing execution system whereby manufacturing productivity and product quality are increased. Costs are streamlined over time.

Example 2

Utilizing the Manufacturing Execution System to Monitor a Pasteurization Process for Baby Formula Manufacture Generally speaking and for purposes of this example, pasteurization is a process of heating liquids for the purpose of destroying bacteria, protozoa, molds, and yeasts. Pasteurization is not intended to kill all pathogenic micro-organisms in active baby formula ingredients. Instead, pasteurization aims to reduce the number of viable pathogens so they are unlikely to cause disease (assuming, of course, that the baby formula is consumed before its expiration date). Baby formula pasteurization typically uses temperatures below boiling since at temperatures above the boiling point for milks, casein micelles, will irreversibly aggregate (or "curdle"). There are two (2) main types of pasteurisation used today. High Temperature/Short Time (HTST) and Extended Shelf Life (ESL) treatment. In addition, ultra-high temperature (UHT or ultra-heat treated) and Flash Pasteurization are also used for baby formula treatment.

In the HTST process, active baby formula ingredient is forced between metal plates or through pipes heated on the outside by hot water, and is heated to approximately 150° F.-167° F., preferably approximately 161° F. for 10-25 seconds, preferably 15-20 seconds. The HTST pasteurisation standard was designed to achieve a 5-log reduction, killing 99.999% of the number of viable micro-organisms in baby formula. Generally, in the art, this is considered adequate for destroying almost all yeasts, mold, and common spoilage bacteria and also to ensure adequate destruction of common pathogenic heat-resistant organisms (including *Mycobacterium tuberculosis*, which causes tuberculosis and *Coxiella bumetii*, which causes Q fever). HTST pasteurization processes must be designed so that the active baby formula ingredients are heated evenly, and no part of the active baby formula ingredients are subject to a shorter time or a lower temperature.

During the UHT pasteurization process the active baby formula ingredient is held at a temperature of 240° F.-260° F., preferably 250° F. for only a fraction of a second.

The ESL method utilizes active baby formula ingredient with a microbial filtration step and generally lower temperatures than the HTST method.

Flash pasteurization works by rapidly heating active baby formula ingredients to a temperature of around 160-180° F. prior to the filling and packaging processes. The active baby formula ingredient will be kept at this temperature for less than 20 seconds prior to being rapidly cooled. The flash pasteurization process has some space and cost advantages due to handling the beverage in bulk before filling.

The HTST process is a form of "indirect" pasteurization (See, FIG. 3A) because the active baby formula ingredients are sent via pipeline through heated plates. Conversely, "Direct" pasteurization (See, FIG. 3B), which includes UHT pasteurization brings the active baby formula ingredients in direct contact with flash vapor (steam) followed by flash cooling.

In one embodiment, the MES is integrated into a baby formula pasteurization system (FIGS. 3A and 3B) used in baby formula manufacture. It will be understood by one of skill in the art that the MES integrates the hardware via generally understood devices in the art (i.e. attached to the analog device via an analog to digital converter). The MES is integrated into the baby formula pasteurization system on a device-by-device basis. As previously, set forth, the acceptance criteria of all devices used in baby formula manufacture for the purposes of pasteurization are determined by the quality control unit. The analysis of the software and hardware occurs using any of the methods disclosed herein. The MES monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined pasteurization process and will monitor to ensure that the pasteurization system data is integrated into liquid mixing and powder blending systems and other systems used in baby formula manufacture.

In addition, the invention comprises monitoring the data from initial process, monitoring the data at the end process, and monitoring the data from a routine maintenance schedule to ensure the system maintain data integrity and validation standard predetermined by the quality control unit. (See, FIG. 3A and FIG. 3B).

In one embodiment, the monitoring and analysis of the pasteurization systems achieves a step of integration into a manufacturing execution system whereby manufacturing productivity and product quality are increased. Costs are streamlined over time.

Example 3

Utilizing the Manufacturing Execution System to monitor the Homogenization Process for Baby Formula Manufacture In the context of baby formula manufacturing, homogenization is a term connoting a process that makes a mixture the same throughout the entire substance. In this case of the instant invention, the mixture is active baby formula ingredient(s) which, in a preferred embodiment have undergone pasteurization. For baby formula this is necessary to increase emulsion uniformity and stability by reducing the size of the fat and oil particles in the baby formula. To achieve this, modern homogenization technology is based on the use of pressure on liquids to subdivide particles or droplets present in fluids into the very smallest sizes (submicron) and create a stable dispersion ideal for further processing (i.e. standardization, etc.). The passage of active baby formula product at very high pressure through a specially designed valve with an adjustable gap, called a homogenizing valve, is able to microsize dispersed particles down to the order of magnitude of micrometers and nanometers. (FIG. 4). The fluid passes through a minute gap in the homogenizing valve. This creates conditions of high turbulence and shear, combined with compression, acceleration, pressure drop, and impact causing the disintegration of particles and dispersion throughout the product. After homogenization, the particles are of a uniform size, typically from 0.2 to 2 micron, depending on the operating pressure. This is an important stage in the production of baby formula products. It provides improved product stability, shelf life, digestion, and taste. Homogenizing can also significantly reduce the amount of additives required. It prepares baby formula so that subsequent spray drying produces the best quality of powders. This is especially important for baby formula.

The current processes or methods of homogenizing of the instant invention can be broken down into three (3) major categories, ultrasonic, pressure, and mechanical. Ultrasonic homogenization is a widely used method to disrupt cells using ultrasonic disruption. These devices work by generating intense sonic pressure waves in a liquid media. The pressure waves cause streaming in the liquid and, under the right conditions, rapid formation of micro-bubbles which grow and coalesce until they reach their resonant size, vibrate violently, and eventually collapse. This phenomenon is called cavitation. The implosion of the vapor phase bubbles generates a shock wave with sufficient energy to break covalent bonds. Shear from the imploding cavitation bubbles as well as from eddying induced by the vibrating sonic transducer disrupt cells. There are several external variables which must be optimized to achieve efficient cell disruption. These variables are: tip amplitude and intensity, temperature, cell concentration, pressure, vessel capacity and shape.

Pressure homogenization is another widely used homogenization method. Generally, with the exception of highly filamentous microorganisms, this method has been found to be generally suitable for a variety of bacteria, yeast, and mycelia. This type of homogenizer works by forcing cell suspensions through a very narrow channel or orifice under pressure. Subsequently, and depending on the type of high-pressure homogenizer, they may or may not impinge at high velocity on a hard-impact ring or against another high-velocity stream of cells coming from the opposite direction. Machines which include the impingement design are more effective than those which do not. Disruption of the cell wall occurs by a combination of the large pressure drop, highly focused turbulent eddies, and strong shearing forces. The rate of cell disruption is proportional to approximately the third power of the turbulent velocity of the product flowing through the homogenizer channel, which in turn is directly proportional to the applied pressure. Thus, the higher the pressure, the higher the efficiency of disruption per pass through the machine. The operating parameters which affect the efficiency of high-pressure homogenizers are as follows: pressure, temperature, number of passes, valve and impingement design, and flow rate. An exemplary embodiment is set forth in FIG. 4.

Mechanical homogenization is the final type of homogenization method and can be broken down into two (2) subcategories. Rotor-stator homogenizers and blade type homogenizers. Rotor-stator homogenizers (also called colloid mills) generally outperform cutting blade-type blenders and are well suited for plant and animal tissue. Combined with glass beads, the rotor-stator homogenizer has been successfully used to disrupt microorganisms. However, the homogenized sample is contaminated with minute glass and stainless steel particles and the abrasive wear to the rotor-stator homogenizer is unacceptably high. This is why this homogenizing method is rarely used in baby formula manufacture. Cell disruption with the rotor-stator homogenizer involves hydraulic and mechanical shear as well as cavitation.

Finally, blade type homogenizers are less efficient that rotor-stator homogenizers. In addition, many plant tissue homogenizers undergo enzymatic browning which is a bio-chemical oxidation process which can complicate subsequent separation procedures. For this reason, blade type homogenization is not commonly used in baby formula manufacture.

In one embodiment, the pasteurized active baby formula ingredient(s) (See, Example 2 entitled "Utilizing the Manufacturing Execution System to monitor the Pasteurization Process for baby formula manufacture) is ran through a homogenization system (See, FIG. 4). The active baby formula ingredient(s) are homogenized to the proper parameters and is sent to the standardization phase. Once the product is homogenized, it is stored using standard methods in a storage tank (FIG. 4 and FIG. 5).

In one embodiment, the MES is integrated into the homogenization system used in baby formula manufacture. It will be understood by one of skill in the art that the MES integrates the hardware via generally understood devices in the art (i.e. attached to the analog device via an analog to digital converter). The MES is integrated into the homogenization system on a device-by-device basis. As previously, set forth, the acceptance criteria of all devices used in baby formula manufacture for the purposes of the homogenization process are determined by the quality control unit. The analysis of the software and hardware occurs using any of the methods disclosed herein. The MES monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined homogenization process and will monitor to ensure that the homogenization system data is integrated into the homogenization processes. In addition, the invention comprises monitoring the data from initial process, monitoring the data at the end process, and monitoring the data from a routine maintenance schedule to ensure the system maintain data integrity and validation standard predetermined by the quality control unit. (See, FIG. 4).

In one embodiment, the monitoring and analysis of the homogenization systems achieves a step of integration into a manufacturing execution system whereby manufacturing productivity and product quality are increased. Costs are streamlined over time.

Example 4

Utilizing the Manufacturing Execution System to monitor a Standardization Process for Baby Formula Manufacture Once the active baby formula ingredient(s) have been homogenized, the next step is standardization. During the standardization step, the resulting baby formula composition is standardized to ensure key parameters, such as pH, fat concentration, and vitamin(s) and mineral(s) are correct (generally against the previously set forth quality parameters provided by the quality control unit). If any of these ingredients are at insufficient levels (i.e. outside quality parameters) the baby formula batch can be reworked to achieve the appropriate levels. The batch is then ready to be packaged.

In one embodiment, the homogenized active baby formula ingredient(s) (See, Example 3 entitled "Utilizing the Manufacturing Execution System to monitor the Homogenization Process for baby formula manufacture) is ran through a standardization system (See, FIG. 5). The active baby formula ingredient(s) are standardized to the proper parameters and is sent to the packaging phase. Once the product is standardized, it is stored using standard methods in a storage tank (FIG. 5 and FIG. 6).

In one embodiment, the MES is integrated into the standardization system used in baby formula manufacture. It will be understood by one of skill in the art that the MES integrates the hardware via generally understood devices in the art (i.e. attached to the analog device via an analog to digital converter). The MES is integrated into the standardization system on a device-by-device basis. As previously, set forth, the acceptance criteria of all devices used in baby formula manufacture for the purposes of the standardization process are determined by the quality control unit. The analysis of the software and hardware occurs using any of the methods disclosed herein. The MES monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined standardization process and will monitor to ensure that the standardization system data is integrated into the standardization processes. In addition, the invention comprises monitoring the data from initial process, monitoring the data at the end process, and monitoring the data from a routine maintenance schedule to ensure the system maintain data integrity and validation standard predetermined by the quality control unit. (See, FIG. 5).

In one embodiment, the monitoring and analysis of the standardization systems achieves a step of integration into a manufacturing execution system whereby manufacturing productivity and product quality are increased. Costs are streamlined over time.

Example 5

Utilizing the Manufacturing Execution System to monitor a Packaging Process for Baby Formula Manufacture Packaging of active baby formula ingredient(s) are important aspects of the baby formula manufacturing process given that the finished baby formula product is then ultimately distributed to the consumer. Currently, the vast majority of baby formula products are administered orally. Several alternative forms of baby formula product include but are not limited to powders, ready-made liquids, and liquids. Accordingly, the need for safe uniform packaging of baby formula product is apparent to one of skill in the art.

In one embodiment, the standardized active baby formula ingredient(s) (See, Example 4 entitled "Utilizing the Manufacturing execution system to monitor the Standardization process for baby formula manufacture") is sent to finishing and packaging and active baby formula ingredient(s) are arranged into the proper dosage form and checked for uniform properties (See, FIG. 6). The active baby formula ingredient(s) are filled into the proper dosage form. (FIG. 6).

Once the baby formula product is filled and sealed the package is inspected to ensure proper sealing prior to sterilization (FIG. 7) and then the packaged baby formula product is sent to sterilization and is then stored using standard methods. (FIG. 6 and FIG. 7).

In one embodiment, the manufacturing execution system is integrated into the packaging system hardware. It will be understood by one of skill in the art that the manufacturing execution system integrates the hardware via generally understood devices in the art (i.e. attached to the analog device via an analog to digital converter).

The MES is integrated into the packaging system on a device-by-device basis. (FIG. 6). As previously set forth, the acceptance criteria of all devices used in the baby formula product manufacture for the purposes of the packaging process are determined by the quality control unit. The analysis of the software and hardware occurs using any of the methods disclosed herein. The program monitors and processes the data and stores the data using standard methods. The data is provided to an end user or a plurality of end users for assessing the quality of data generated by the device. Furthermore, the data is stored for comparative analysis to previous baby formula batches to provide a risk-based assessment in case of failure. Using the historical analysis will provide a more streamlined packaging process and will monitor to ensure that ingredients are mixed and packaged properly. In addition, the invention comprises monitoring the data from initial process, monitoring the data at the end process, and monitoring the data from a routine maintenance schedule to ensure the system maintain data integrity and validation standard predetermined by the quality control unit.

In one embodiment, the monitoring and analysis of the packaging systems achieves a step of integration into a manufacturing execution system whereby manufacturing productivity and product quality are increased. Costs are streamlined over time.

Example 6

Utilizing the Manufacturing Execution System to monitor a Sterilization Process for Baby Formula Manufacture Generally, and for purposes of this example, sterilization is a process that effectively kills or eliminates transmissible agents (such as fungi, bacteria, viruses, prions, and spore forms, etc.) from baby formula product and baby formula product packaging. Sterilization can be achieved through application of heat, chemicals, irradiation, high pressure or filtration. There are generally two types of sterilization, physical and chemical.

Physical sterilization includes heat sterilization and radiation sterilization. Chemical sterilization includes the addition of chemicals to facilitate the sterilization process. In baby formula manufacture, heat sterilization is common since it is the least invasive and baby formula is highly regulated from a quality standpoint (the end user being of course, infants).

Dry heat sterilization utilizes hot air that is either free from water vapour, or has very little of it, and where this moisture plays a minimal or no role in the process of sterilization. Generally, dry heat coagulates the proteins in any organism, causes oxidative free radical damage, causes drying of cells, effectively killing the microorganism. General methods of dry heat sterilization include but are not limited to the use of a hot air oven, flaming, radiation, or microwaves (See, FIG. 7).

Conversely, moist heat sterilization, as the name implies, utilizes hot air that is heavily laden with water vapour and where this moisture plays the most important role in the process of sterilization. Moist heat coagulates the proteins in any organism and this is aided by the water vapour that has a very high penetrating property, leading to their death. It also causes oxidative free radical damage. This can even, at high enough temperatures kill prions.

Sterility assurance level (SAL) is a term used in baby formula manufacture to describe the probability of a single unit being non-sterile after it has been subjected to the sterilization process. For example, baby formula manufacturers design their sterilization processes for an extremely low SAL-"one in a million" baby formula product units should be nonsterile. SAL is also used to describe the killing efficacy of a sterilization process, where a very effective sterilization process has a very high SAL.

In one embodiment, the packaged baby formula product (See, Example 5 entitled "Utilizing the Manufacturing execution system to monitor a Packaging process for baby formula manufacture") is sent to a sterilization process (See, FIG. 7) whereby the baby formula product is then ready to be shipped to end users.

Once the baby formula product is sterilized within predetermined sterility assurance levels set forth by the quality control unit it is then stored using standard methods. (FIG. 7).

In one embodiment, the manufacturing execution system is integrated into the sterilization system hardware. It will be understood by one of skill in the art that the manufacturing execution system integrates the hardware via generally understood devices in the art (i.e. attached to the analog device via an analog to digital converter).

The MES is integrated into the sterilization system on a device-by-device basis. (FIG. 7). As previously set forth, the acceptance criteria of all devices used in the baby formula product manufacture for the purposes of the sterilization process are determined by the quality control unit. The analysis of the software and hardware occurs using any of the methods disclosed herein. The program monitors and processes the data and stores the data using standard methods. The data is provided to an end user or a plurality of end users for assessing the quality of data generated by the device. Furthermore, the data is stored for comparative analysis to previous baby formula batches to provide a risk-based assessment in case of failure. Using the historical analysis will provide a more streamlined sterilization process and will monitor to ensure that ingredients are mixed and packaged properly. In addition, the invention comprises monitoring the data from initial process; monitoring the data at the end process, and monitoring the data from a routine maintenance schedule to ensure the system maintain data integrity and validation standard predetermined by the quality control unit.

In one embodiment, the monitoring and analysis of the sterilization systems achieves a step of integration into a manufacturing execution system whereby manufacturing productivity and product quality are increased. Costs are streamlined over time.

Example 7

Utilization of Manufacturing Execution System in Commercial Baby Formula Manufacturing Processes The invention comprises a method for monitoring the acceptance criteria of all components used in baby formula manufacture. The analysis of the software and hardware occurs using any of the methods disclosed herein. The program monitors and processes the data and stores the data using methods known in the art. The data is provided to an end user or a plurality of end users for assessing the quality of the baby formula batch. Furthermore, the data is stored for comparative analysis to previous baby formula batches to provide a risk-based assessment in case of failure. Using the historical analysis will provide a more streamlined baby formula manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 8

Integration of the Manufacturing Execution System into a Baby formula Manufacturing Device The invention comprises the integration of the manufacturing execution system into a baby formula manufacturing device. In this context, a device used in the baby formula manufacturing process includes, but is not limited to, blenders, bioreactors, capping machines, chromatography/separation systems, chilled water/circulating, glycol, coldrooms, clean steam, clean-in-place (CIP), compressed air, D.I./R.O. watersystems, dry heat sterilizers/ovens, fermentation equipment/bioreactors, freezers, filling equipment, filtration/purification, HVAC, environmental controls, incubators, environmentally controlled chambers, labelers, lyophilizers, dryers, mixing tanks, modular cleanrooms, neutralization systems, plant steam and condensation systems, process tanks, pressure systems, vessels, refrigerators, separation/purification equipment, specialty gas systems, steam generators/pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), centrifuges, user-independent audit trails, time-stamped audit trails, data security, confidentiality systems, limited authorized system access, electronic signatures, bar codes, dedicated systems, add-on systems, control files, Internet, LAN's, portable handheld devices, homogenizers, sterilizers, pasteurizers, etc.

It will be understood by one of skill in the art that the manufacturing execution system integrates the hardware via generally understood devices in the art (i.e. attached to the analog device via an analog to digital converter).

The manufacturing execution system is integrated into the baby formula manufacturing system on a device-by-device basis. (FIG. 2-FIG. 7). As previously set forth, the acceptance criteria of all devices used in the baby formula product manufacture for the purposes of the baby formula manufacturing process are determined by the quality control unit. The analysis of the software and hardware occurs using any of the methods disclosed herein. The program monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined baby formula manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 9

Integration of Manufacturing Execution System and Analysis Methods into a Comprehensive Cost-Saving System The invention comprises a manufacturing execution system integrated into a comprehensive cost-saving baby formula manufacturing system. A user, preferably a system administrator, logs onto the system via secure means (i.e. password or other security measures known in the art) and inputs the boundary values for a particular component of the baby formula manufacturing process (i.e. upper and lower limits of pH, temperature, concentration, volume, blending speed, SAL, homogenization pressure, packaging unit weight, etc.) The input is at the initial stage of baby formula manufacture, the end product stage of baby formula manufacture, or any predetermined interval in between that has been established for routine maintenance by the quality control unit. The data is generated using any one of the various analysis methods described herein (as previously stated the type of analysis used is functional to the device or protocol being monitored or evaluated). Subsequent to the data analysis, any modifications or corrective action to the baby formula manufacturing process is implemented. The data is then stored by standard methods known in the art. Scheduled analysis of the stored data is maintained to provide a preventative maintenance of the baby formula manufacturing process. Over time, costs are reduced due to the tracking of data and analysis of troubled areas and frequency of hazards that occur on any given device in the baby formula manufacturing process. The system is implemented on every device which plays a role in baby formula manufacturing. (FIG. 2-FIG. 7). The data compiled from every device is analyzed using the methods described herein.

Example 10

Integration of Method(s) and Program(s) into an Manufacturing Execution System (MES)

Background:

A paradigm shift is needed in the way baby formula is manufactured. Current processes are not readily understood by the industry at-large and the processes are time consuming and produce lower quality products. One of ordinary skill will appreciate that a lower quality baby formula batch is essentially, a waste. Often the baby formula batch must be run again using different production and system parameters. Quality control units that can continuously monitor a specific baby formula manufacturing process and use that data, via data analysis methods disclosed herein, will allow baby formula manufacturers to produce higher quality baby formula products in a faster timeframe. The fountainhead goal is to build quality into a baby formula product, rather than test for quality after the baby formula product is made. This Quality by Design (QbD) approach will allow one of ordinary skill in the art to understand that the former method is advantageous since it will be easier to locate a defect in baby formula manufacturing if monitoring is continuous rather that post-production or post-process. It is an object of the invention to provide this advantage.

Integration:

In one embodiment, the software program is integrated into a manufacturing execution system that controls the baby formula manufacturing process (generally set forth in FIG. 1). It will be understood by one of skill in the art that the software program/computer product integrates the hardware via generally understood devices in the art (i.e. attached to the analog device via an analog to digital converter).

The software program/computer product is integrated into a manufacturing execution system on a device-by-device basis. (FIG. 2-FIG. 7). As previously set forth, the acceptance criteria of all devices used in baby formula manufacture for the purposes of the manufacturing execution system are determined by the quality control unit. (FIG. 2-FIG. 7). The analysis of the software and hardware occurs using any of the methods disclosed herein. The program monitors and processes the data and stores the data using standard methods. The data is provided to an end user or a plurality of end users for assessing the quality of data generated by the device or devices. Furthermore, the data is stored for comparative analysis to previous baby formula batches to provide a risk-based assessment in case of failure. Using the historical analysis will provide a more streamlined baby formula manufacturing process and will monitor to ensure that baby formula product quality is maximized. In addition, the invention comprises monitoring the data from initial process; monitoring the data at the end process, and monitoring the data from a routine maintenance schedule to ensure the system maintain data integrity and validation standards predetermined by the quality control unit.

The present invention is not to be limited in scope by the embodiments disclosed herein, which are intended as single illustrations of individual aspects of the invention, and any that are functionally equivalent are within the scope of the invention. Various modifications to the models, methods, and life cycle methodology of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

The invention claimed is:

1. A method of controlling a baby formula manufacturing process using a manufacturing execution system (MES) adapted for use in manufacturing baby formula said method comprising,
   a) contacting a MES to a plurality of devices used in baby formula manufacturing, wherein said devices are used to produce a baby formula product;
   b) monitoring data generated by the devices with said MES, wherein said data is compiled during baby formula manufacture and wherein said data is generated at predetermined control points;
   c) analyzing the data to provide a risk-based assessment in case of a quality failure during baby formula manufacture; and
   d) taking corrective action to obviate the quality failure wherein said corrective action comprises modifying said baby formula manufacturing.

2. The method of claim 1, wherein said devices are selected from the group consisting of blenders, capping machines, chromatography/separation, chilled water/circulating, cold-rooms, clean steam, clean-in-place (CIP), compressed air, deionized / reverse osmosis (DI/R.O.) watersystems, dry heat sterilizers/ovens, freezers, filtration/purification, HVAC, environmental controls, environmentally controlled chambers, labelers, lyophilizers, dryers, modular cleanrooms, neutralization systems, plant steam and condensation systems, pressure systems, vessels, refrigerators, separation/purification equipment, specialty gas systems, steam generators/pure steam systems, steam sterilizers, stopper washers, solvent recovery systems, tower water systems, waste inactivation systems, kill systems, vial inspection systems, vial washers, water for injection (WFI) systems, pure water systems, washers (glass, tank, carboys), centrifuges, user-independent audit trails, time-stamped audit trails, confidentiality systems, limited authorized system access, electronic signatures, bar codes, dedicated systems, add-on systems, control files, LANs, portable handheld devices, homogenizers, and pasteurizers.

3. A non-transitory computer memory having computer executable instructions which when executed on a computer processor in a baby formula manufacturing environment performs the method of claim 1.

4. A method of monitoring a baby formula manufacturing process using a manufacturing execution system (MES) said method comprising,
   a) deriving an algorithm implemented in non-transitory computer-readable instructions that performs data analysis on an baby formula manufacturing process wherein said baby formula manufacturing process produces an active baby formula ingredient;
   b) contacting said algorithm to a MES, wherein said MES integrates a plurality of devices used in baby formula manufacture that produces an active baby formula ingredient;
   c) analyzing the data generated by said MES to provide a risk-based assessment in case of failure, wherein said data is generated at predetermined control points of said baby formula manufacturing process; and
   d) taking corrective action to obviate the failure.

5. The method of clam 4, further comprising maintaining a historical record of the data analysis.

6. The method of claim 4, wherein the monitoring is continuous.

7. A method of monitoring an acceptance criteria of a baby formula manufacturing system, said method comprising,
   a) monitoring data generated by an baby formula manufacturing execution system (MES) during baby formula manufacture, wherein said baby formula manufacture produces a baby formula product and wherein said data is generated at a predetermined control point;
   b) maintaining the data over time to provide a historic record;
   c) analyzing the historic record to provide a comparative analysis against a predetermined acceptance criteria, wherein said historic record is analyzed by a quality control unit; and
   d) taking corrective action during baby formula manufacture to obviate a rejection against said predetermined acceptance criteria.

8. The method of claim 7, comprising monitoring an acceptance criteria of a baby formula synthesis system.

9. The method of claim 7, comprising monitoring an acceptance criteria of a baby formula fermentation system.

10. The method of claim 7, comprising monitoring an acceptance criteria of a baby formula DNA extraction system.

11. The method of claim 7, comprising monitoring an acceptance criteria of a baby formula purification system.

12. The method of claim 7, comprising monitoring an acceptance criteria of a baby formula packaging system.

13. The method of claim 7, wherein the monitoring is continuous.

14. The methods of claim 7, wherein the acceptance criteria is a sterility assurance level (SAL).

* * * * *